(12) United States Patent
Nelson

(10) Patent No.: US 7,441,659 B2
(45) Date of Patent: Oct. 28, 2008

(54) CUTLERY RECEPTACLE

(76) Inventor: Gary W. Nelson, 5854 Coveview Dr., West, Lakeland, FL (US) 33813

( * ) Notice: Subject to any disclaimer, the term of this patent is extended or adjusted under 35 U.S.C. 154(b) by 0 days.

(21) Appl. No.: 11/894,211

(22) Filed: Aug. 20, 2007

(65) Prior Publication Data
US 2008/0041757 A1    Feb. 21, 2008

Related U.S. Application Data

(60) Provisional application No. 60/838,966, filed on Aug. 21, 2006.

(51) Int. Cl.
B65D 1/34    (2006.01)

(52) U.S. Cl. ............ 206/553; 30/298.4; 211/70.7; 248/37.3

(58) Field of Classification Search ........... 206/553; 30/136, 151, 296.1, 298.4; 211/70.7; 248/37.3, 248/37.6; 269/289 R; D7/698
See application file for complete search history.

(56) References Cited

U.S. PATENT DOCUMENTS

| | | |
|---|---|---|
| 116,807 A | 7/1871 | Cherrington |
| 1,052,813 A | 2/1913 | Gibbons |
| 1,662,077 A | 3/1928 | Schwartz |
| 1,886,075 A | 11/1932 | Zorsch |
| D132,775 S | 6/1942 | Case |
| D159,185 S | 7/1950 | Case |
| D217,692 S | 5/1970 | King |
| 3,580,394 A * | 5/1971 | Elliot .................. 248/316.3 |
| 3,926,419 A | 12/1975 | Kenny |
| 4,015,330 A | 4/1977 | Popeil et al. |
| 4,065,115 A | 12/1977 | Popeil et al. |
| 4,561,548 A * | 12/1985 | Call .................... 211/70.7 |
| 4,787,582 A * | 11/1988 | Geleziunas ........... 248/37.3 |
| 4,934,539 A * | 6/1990 | Lu ...................... 211/70.7 |
| D309,407 S | 7/1990 | May |
| D317,551 S | 6/1991 | King |
| 5,312,178 A | 5/1994 | King |
| D382,775 S | 8/1997 | Skerker et al. |
| 5,725,108 A | 3/1998 | Olson |
| 5,850,784 A | 12/1998 | Conner |
| D411,718 S | 6/1999 | Davis et al. |
| 6,058,609 A | 5/2000 | Yen et al. |
| 6,581,774 B1 | 6/2003 | Galafassi et al. |
| 6,659,406 B2 | 12/2003 | Tsuchida |
| 2003/0095398 A1 | 5/2003 | Tsuchida |
| 2006/0085989 A1 * | 4/2006 | Kuan Huo ........... 30/298.4 |

* cited by examiner

Primary Examiner—Luan K Bui
(74) Attorney, Agent, or Firm—Frijouf, Rust & Pyle, P.A.

(57) ABSTRACT

An improved receptacle is disclosed for retaining a cutlery instrument, the cutlery instrument has a blade and a handle. The receptacle comprises a base having a base support surface and a base engaging surface. A wall member is secured to the base engaging surface extending substantially perpendicular from said base. A coupling member is secured to the wall member extending substantially parallel and above said base. An arm member is secured to the coupling member extending substantially parallel to the wall member and above the base. A slit is defined between the wall member and the arm member for receiving and maintaining the blade of the cutlery instrument in a static position. A slot is defined between the arm member and the base engaging surface for exposing the wall member.

20 Claims, 20 Drawing Sheets

CUTLERY RECEPTACLE

CROSS-REFERENCE TO RELATED APPLICATIONS

This application claims benefit of United States Patent Provisional application Ser. No. 60/838,966 filed Aug. 21, 2006. All subject matter set forth in provisional application Ser. No. 60/838,966 is hereby incorporated by reference into the present application as if fully set forth herein.

BACKGROUND OF THE INVENTION

1. Field of the Invention

This invention relates to receptacles and more particularly to an improved receptacle for retaining a cutlery instrument.

2. Background of the Invention

Various types of cutlery receptacles have been proposed by the prior art. Cutlery receptacles retain a cutlery instrument in a static position for storage. When a cutlery instrument is to be utilized the cutlery instrument is withdrawn from the cutlery receptacle by an individual. Cutlery receptacles can be beneficial by providing efficient and convenient storage for cutlery instruments.

A cutlery instrument may include one or more blade edges and/or blade tips for cutting and/or impaling an object. The cutlery receptacle may shield the blade edges and/or blade tips when the cutlery receptacle retains a cutlery instrument. By shielding the blade edges and/or blade tips accidental cutting and/or impaling of an individual may be avoided.

In addition, the cutlery receptacles may also retain and/or incorporate other tools and/or cutting surfaces. The following U.S. patents are examples of attempt of the prior art to accomplish the above functions.

U.S. Pat. No. 116,807 to Cherrington discloses a construction and arrangement of the several parts, namely, the base, the rests and the protection in a manner substantially as and for the purpose or purposes hereinbefore set forth.

U.S. Pat. No. 1,052,813 to Gibbons discloses a holder having a chamber for the reception of spoons or other like articles. The holder has a slot for the reception of the handles of the spoons or other articles. The bottom surface of the chamber is inclined from the rear toward the front whereby the spoons or other like articles automatically move into position with their tip ends in contact with the forward wall surface of the chamber and with their handles in proper position in the slot.

U.S. Pat. No. 1,662,077 to Schwartz discloses a body having a series of holes therein to receive crayons endwise. A stop member at one side of the holes limits the distance crayons can be inserted therethrough. The stop member forms space between the body and itself to receive crayons therebetween.

U.S. Pat. No. 1,886,075 to Zorsch discloses a body formed of a substantially rectangular-shaped frame open throughout its extent and having at its marginal top edge an inbent rest flange unbroken throughout the edge. A tray received in the frame and having an outturned marginal flange rests upon the flange of the frame and overlaps the same. An upright plate carries at one end of the frame and extends above the plane of the top thereof and has vertical slots disposed an equi-distance from each other. Means on the plate and projected laterally outwardly therefrom to constitute a rest for articles when engaged in the slots and received in the tray.

U.S. Pat. No. 3,926,419 to Kenny discloses a cutting board and cutlery set. The board includes a juice trough on one side spaced inwardly from the edge to define a cutting surface and a number of elongate recesses provided in a parallel spaced relation on the bottom of the board. The cutlery set includes a number of knives and a fork each having a handle having a configuration to fit within a corresponding recess. A cross bar is supported on the bottom of the board by a pair of spring coils to bias the cross bar into engagement with the bottom of the board to hold the knives in the recesses. A supporting post is at each corner of the board to provide sufficient space beneath the board for storing the cutlery set.

U.S. Pat. No. 4,015,330 to Popeil, et al. discloses a cutting board case and knife set wherein the cutting board comprises two halves, folded along a center line, and secured together by means of a sliding bolt type latch. The two halves are hinged, and each half has a knife handle recess which accommodates one half of the handle of the knife, the cutting blade extending longitudinally adjacent the center fold portion of the cutting board. The two halves of the cutting board, when folded together, have a releasable lock and provision may be made for a hanging handle, and also for stopper buttons on the base used to secure the same against dislodgement. The forward end of the cutting board is tapered, and the preferred knife handle is kidney shaped with a flat base for guiding the same along the cutting board, a finger guide at its forward portion, and a central open grip.

U.S. Pat. No. 4,065,115 to Popeil, et al. discloses a cutting board case and knife set wherein the cutting board comprises two halves, folded along a center line, and secured together by means of a sliding bolt type latch. The two halves are hinged, and each half has a knife handle recess which accommodates one half of the handle of the knife, the cutting blade extending longitudinally adjacent the center fold portion of the cutting board. The two halves of the cutting board, when folded together, have a releasable lock and provision may be made for a hanging handle, and also for stopper buttons on the base used to secure the same against dislodgement. The forward end of the cutting board is tapered, and the preferred knife handle is kidney shaped with a flat base for guiding the same along the cutting board, a finger guide at its forward portion, and a central open grip.

U.S. Pat. No. 5,312,178 to King discloses an improvement in countertop mounted cutting apparatus comprising a bracket adapted to fit into an opening in the countertop for supporting a cutting board. The bracket includes a flange portion overlapping the countertop adjacent the opening, characterized by a knife scabbard adjacent the cutting board and supported by the bracket. The knife scabbard has individual slots of varying lengths to receive knives of varying blade widths.

U.S. Pat. No. 5,725,108 to Olson discloses a combination material cutting block presenting a surface to support material when being cut. Legs support the cutting block at a suitable elevation on a work surface. A second block is sized to fit under the surface of the cutting block between the support legs. Slots in the second block retain a set of cutting knives with the blades out of contact from prying fingers and with the handles held for easy withdrawal. Hold down elements are between the blocks in position to hold the knife handles in position when the cutting block is placed over the second block.

U.S. Pat. No. 5,850,784 to Conner discloses a kitchen caddy that includes a main housing block formed of component parts in a manner to define a solid block having a series of grooves formed therein for stowing a variety of knives having blades of varying widths. Connected to either side of the main housing block forms a side housing section having slots formed therein for stowing the handle portions of various kitchen tools such as spoons, forks, spatulas and the like, in combination with a cutting board holder for stowing thereon a cutting board capable of having a width greater than that of the caddy knife block and connected tool holding side housing block.

U.S. Pat. No. 6,058,609 to Yen, et al. discloses a knife holder including two transparent plates, a plurality of partitioning blocks, a plurality of securing blocks, and a plurality of larger securing blocks. The partitioning blocks are spaced equidistantly apart between the plates such that the plates define a receiving space. Upper ends of the plates are provided with a plurality of pairs of opposite indentations. The receiving space and the indentations are sized to receive knives. The knives are divided by the partitioning blocks so that they do not overlap. The partitioning blocks have front and rear ends forming bolt portions that pass through corresponding through holes in the plates for screwable engagement with the securing blocks so that the plates can be screwably secured on the partitioning blocks. The larger securing blocks are secured at two lower corners of each plate so that the knife holder can stand on a planar surface. The knife holder not only permits partitioning of knives but also allows the user to see through the plates to identify correctly and quickly the knives needed, as well as prevents breeding of bacteria and mold.

U.S. Pat. No. 6,581,774 to Galafassi, et al. discloses a knife block to store and protect sharpened kitchen knives. The knife block includes a base and a pivotable tray connected together by a adjustable coupling system. The base includes a plurality of apertures therein that are to receive the blades of sharpened kitchen knives. The pivotable tray is configurable to change the geometry and functionality of the knife block from a folded configuration to a straight configuration. In the folded configuration, the knife block is easily deployed upon a counter top in an upright position. In the straight configuration, the knife block can be deployed upon a horizontal or vertical surface, for example upon a wall or within a drawer.

U.S. Pat. No. 6,659,406 to Tsuchida discloses a knife stand comprising a cover plate and a container shaped main body. An upper aperture of the main body is covered with the cover plate. Insert slits are provided on the cover plate to insert a base part of knife holders into the main body. At least one or more holder parts are provided on a bottom face of the inner main body to fix and hold a base part of each of the knife holders after said knife holders are inserted into the main body. Slot shaped insert parts are provided on the knife holders, respectively. Both a blade part and a grip part are inserted into the knife holders by turning the whole edge of the blade downward. Similarly, both a blade part and a grip part are inserted into the holder by turning the whole edge of the blade downward as well. Each holder parts and the main body are integrally molded with plastic. The holder parts are provided on the bottom face of the inner main body.

U.S. Pat. No. D132,775 to Case discloses a ornamental design for a combined hone and receptacle for a knife.

U.S. Pat. No. D159,185 to Case discloses a ornamental design for a cutlery rack or similar article.

U.S. Pat. No. D217,692 to King discloses a ornamental design for a knife holder.

U.S. Pat. No. D309,407 to May discloses a ornamental design for a combined chopping block with knives, storage, and locking system.

U.S. Pat. No. D317,551 to King discloses a ornamental design for a combination kniferack, cutting board and drain.

U.S. Pat. No. D382,775 to Skerker et al. discloses a ornamental design for a combined knife holder and cutting board.

U.S. Pat. No. D411,718 to Davis et al. discloses a ornamental design for an in drawer knife block.

U.S. Patent Application 2003/0098398 to Tsuchida discloses a knife stand comprising a cover plate and a container shaped main body. An upper aperture of the main body is covered with the cover plate. Insert slits are provided on the cover plate to insert a base part of knife holders into the main body. At least one or more holder parts are provided on a bottom face of inner main body to fix and hold a base part of each of the knife holder after said knife holders are inserted into the main body. Slot shaped insert parts are provided on the knife holders, respectively. Both a blade part and a grip part are inserted into the knife holders by turning whole edge of blade downward. Similarly, both a blade part and a grip part are inserted into the holder by turning whole edge of blade downward as well. Each holder parts and the main body are integrally molded with plastic. The holder parts are provided on the bottom face of inner main body.

Although the aforementioned prior art have contributed to the development of the art of cutlery receptacles, none of these prior art patents have solved the needs of this art.

Therefore, it is an object of the present invention to provide an improved cutlery receptacle for retaining a cutlery instrument in a static position.

Another object of this invention is to provide an improved cutlery receptacle wherein the cutlery instrument is easily inserted and withdrawn from the cutlery receptacle.

Another object of this invention is to provide an improved cutlery receptacle that may retain a cutlery instrument that includes a blade edge and/or blade tip.

Another object of this invention is to provide an improved cutlery receptacle wherein the cutlery receptacle is easily cleaned.

Another object of this invention is to provide an improved cutlery receptacle that may engage a cutting surface.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved receptacle for retaining a cutlery instrument, the cutlery instrument has a blade and a handle. The receptacle comprises a base having a base support surface and a base engaging surface. A wall member is secured to the base engaging surface extending substantially perpendicular from said base. A coupling member is secured to the wall member extending substantially parallel and above said base. An arm member is secured to the coupling member extending substantially parallel to the wall member and above the base. A slit is defined between the wall member and the arm member for receiving and maintaining the blade of the cutlery instrument in a static position. A slot is defined between the arm member and the base engaging surface for exposing the wall member.

In a more specific embodiment of the invention, a top coupling member is secured to the wall member extending substantially perpendicular and above the base for contacting the blade to prevent vertical displacement of the blade. A front coupling member is secured to the wall member extending substantially perpendicular and above the base for contacting the blade to prevent horizontal displacement of the blade. An arm member is secured to the coupling member extending substantially parallel to the wall member and above the base. A rear coupling member is secured between the wall member and the arm member for contacting the blade heel to prevent horizontal displacement of the blade In one embodiment of the invention, a cutlery board has a board support surface and a board engaging surface. The board support surface is positioned adjacent to the base engaging surface and below the slit for permitting the blade of the cutlery instrument to rest upon the board engaging surface. A cavity is defined between the top coupling member and the base engaging surface for exposing the wall member and permitting the cutlery board to traverse below the arm member. An opening is defined between the front coupling member and the base engaging surface for exposing the wall member and permitting the cutlery board to traverse below the arm member. An orifice is defined between the rear coupling member the base engaging surface for exposing the wall member and permitting the cutlery board to traverse below the arm member.

In another embodiment of the invention, the base, wall, top coupling member, front coupling member, arm member and rear coupling member are an integral one piece unit.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 10:
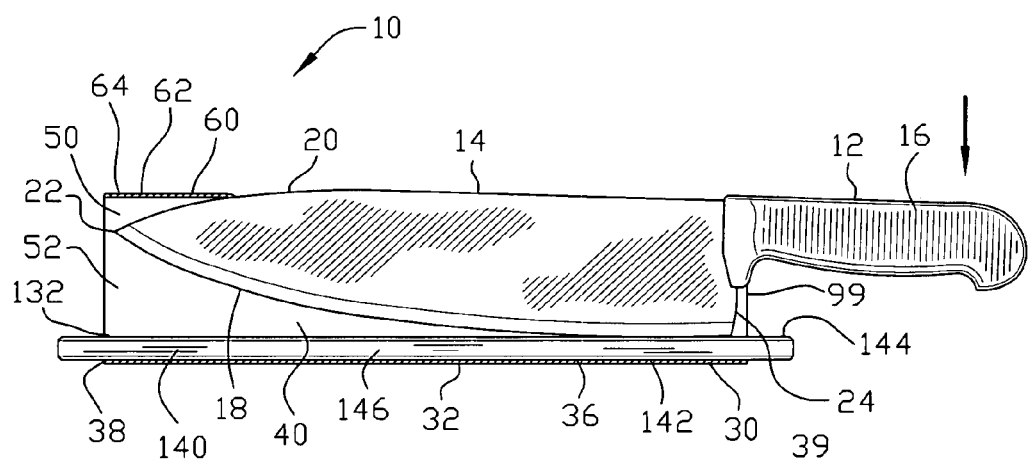
FIG. 10 is a sectional view along line 10-10 in FIG. 7 including a cutlery instrument.

FIGS. 1-10 are various views of a first embodiment of a receptacle 10 for retaining a cutlery instrument 12. As best seen in FIG. 10 the cutlery instrument 12 includes a blade 14 and a handle 16. The blade 14 further includes a blade edge 18, a blade spine 20, a blade tip 22 and a blade heel 24.

The receptacle 10 comprises a base 30 having a base support surface 32 and a base engaging surface 34. The base 30 is shown having a rectangular shape defined by a first edge 36, second edge 37, third edge 38 and fourth edge 39. However, the base 30 may include other geometric shapes and dimensions. The base support surface 32 provides a surface for resting on an ambient surface 26. The base support surface 32 may be permanently mounted to an ambient horizontal surface 26 by a suitable mechanical fastener or an adhesive fastener. Alternatively, the base support surface 32 may merely rest upon the ambient surface 26 without any mechanical fastener or an adhesive fastener.

A wall member 40 is secured to the base engaging surface 34 and extends substantially perpendicular from the base 30. The wall member 40 may be secured to the second edge 37 of the base 30. The base 30 and the wall member 40 may be constructed of an integral one piece unit 42 including a ninety degree bend 44 positioned between the base 30 and the wall member 40 for maintaining the wall member 40 substantially perpendicular to the base 30. The integral one piece unit 42 including the ninety degree bend 44 is constructed from a metallic material by bending sheet metal, metallic material by casting molten metal, polymeric material by injection molding, or other materials and forms of manufacturing. Alternatively, the wall member 40 may be secured at various locations on the base engaging surface 34.

The wall 40 is shown having a rectangle shape defined by a first edge 46, second edge 47, third edge 48 and fourth edge 49. However, the wall 40 may include other geometric shapes and dimensions. The length of the wall member 40 may be equivalent to the length of the base 30 such that the third and fourth edges 48 and 49 of the wall member 40 are adjacent to the third and fourth edge 38 and 39 of the base 30 respectively. Alternatively, the length of the wall member 40 may be smaller or larger than the length of the base 30.

The wall member 40 is shown having a wall extender 50. The wall member 40 and wall extender 50 form a L-shape wall member 52. The L-shape wall member 52 is secured to the base engaging surface 34 extending substantially perpendicular from the base 30. The L-shape wall member 52 and base 30 may be constructed of an integral one piece unit 42 including a ninety degree bend 44 for maintaining the L-shape wall member 52 substantially perpendicular to the base 30. The integral one piece unit 42 including the ninety degree bend 44 is constructed from a metallic material by bending sheet metal, metallic material by casting molten metal, polymeric material by injection molding, or other materials and forms of manufacturing.

Figure 1:
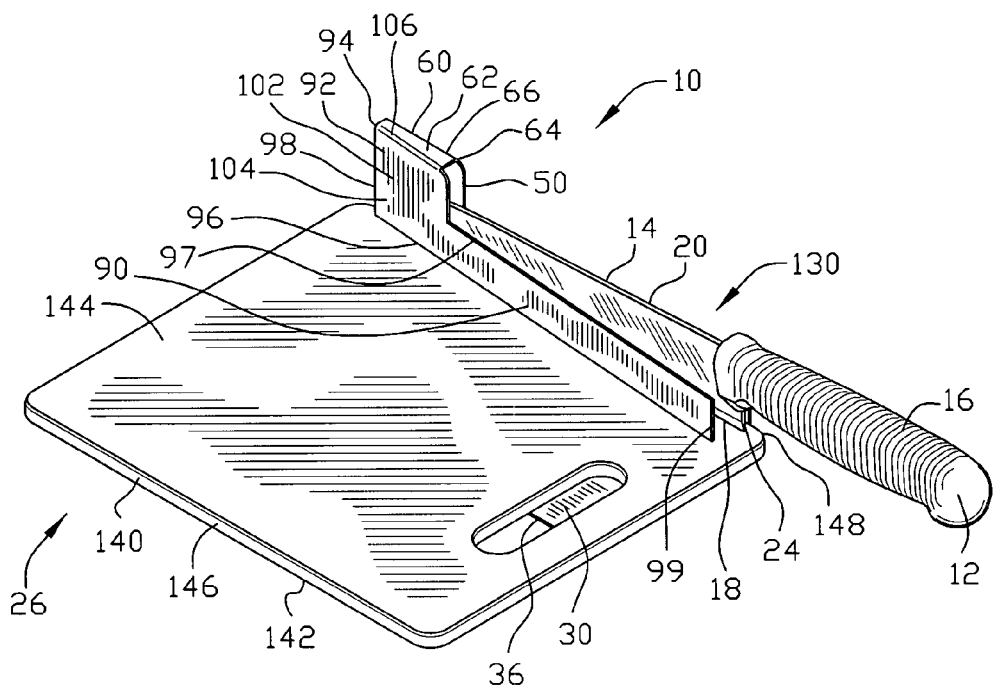
FIG. 1 is a left front isometric view of a receptacle for retaining a cutlery instrument of the present invention.
Figure 2:
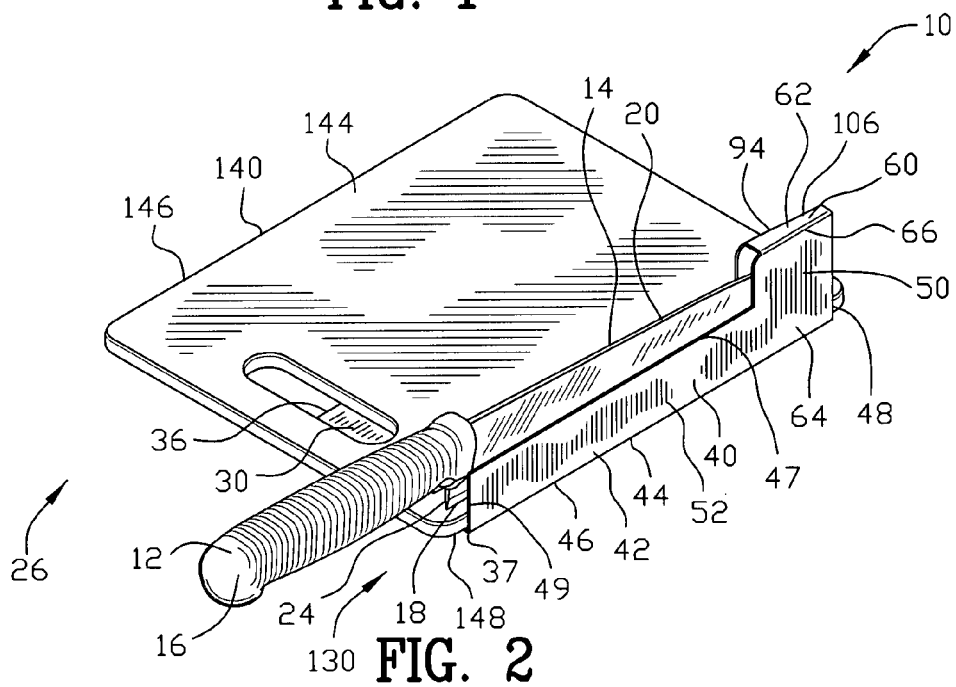
FIG. 2 is a right front isometric view of FIG. 1.
Figure 3:
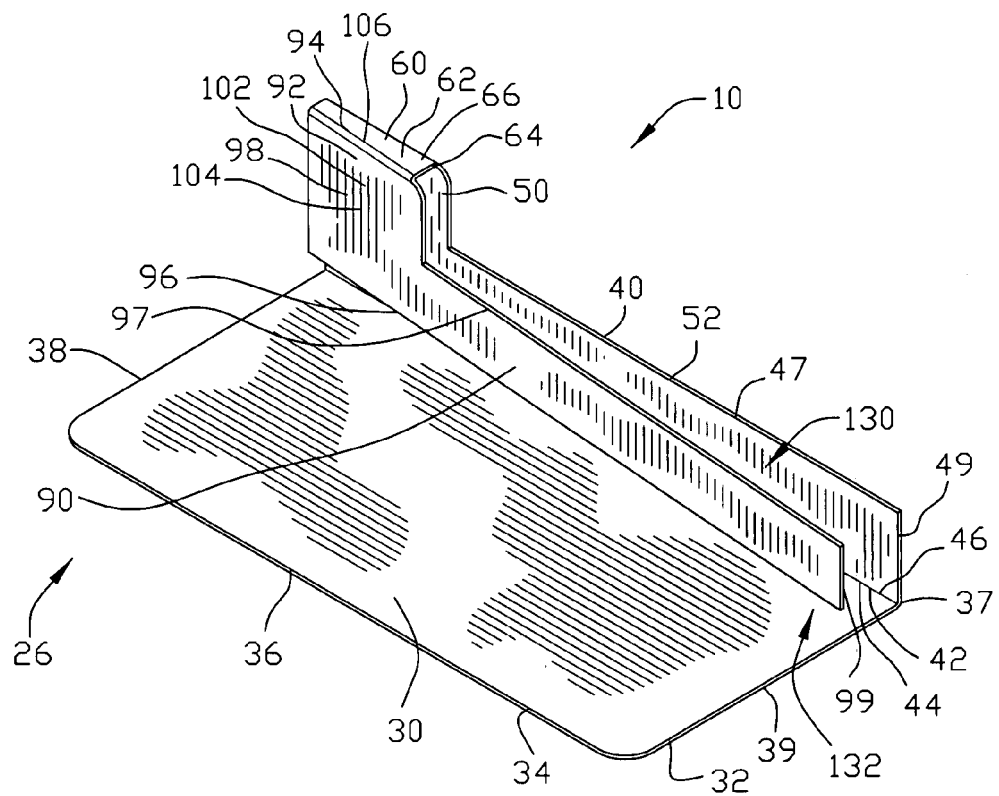
FIG. 3 is a left front isometric view similar to FIG. 1 without the cutlery instrument and cutlery board.
Figure 4:
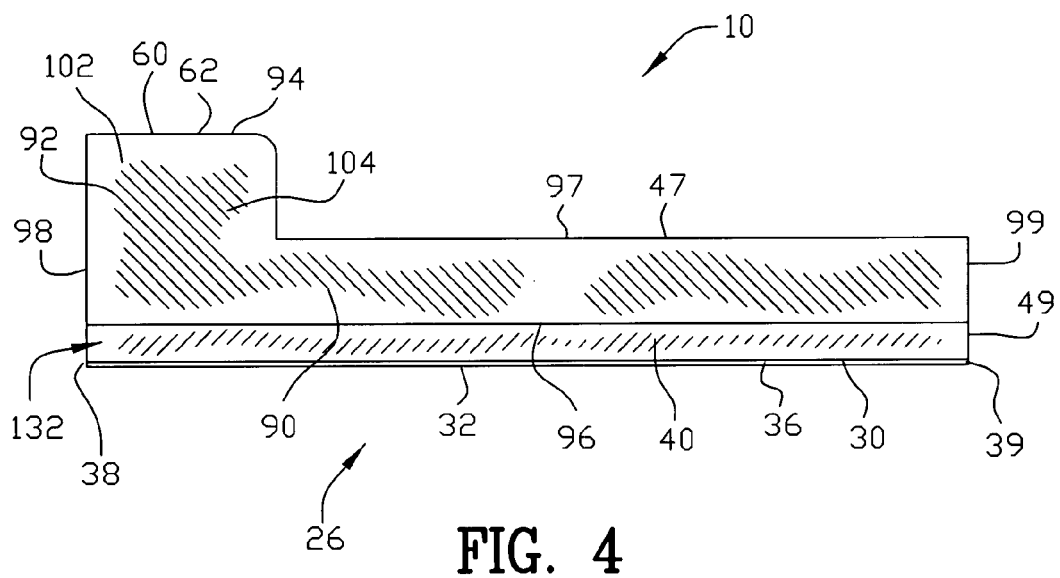
FIG. 4 is a left side view of FIG. 3.
Figure 5:
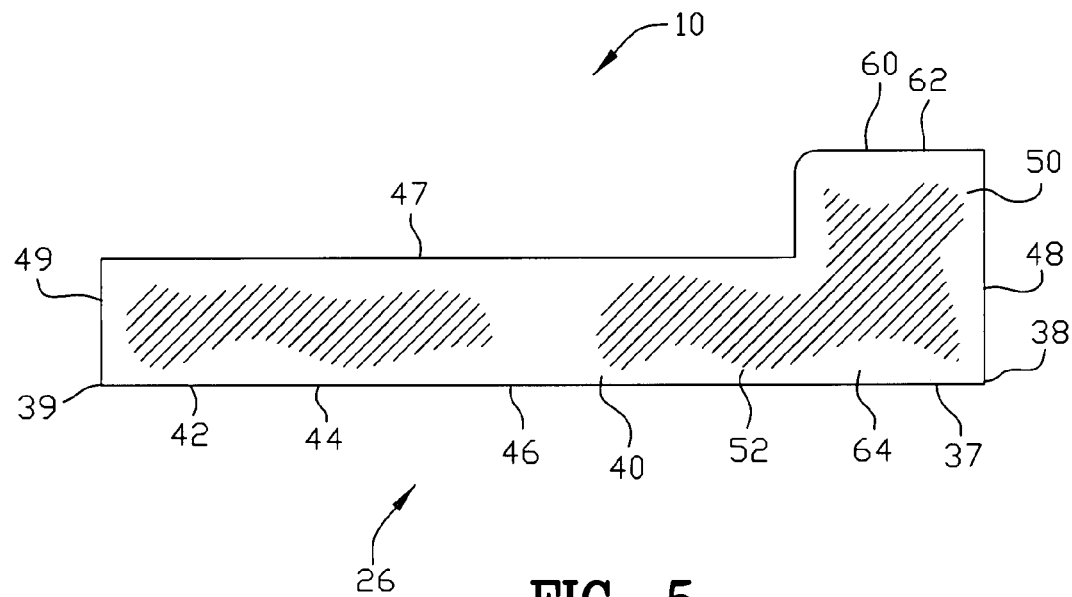
FIG. 5 is a right side view of FIG. 3.
Figure 6:
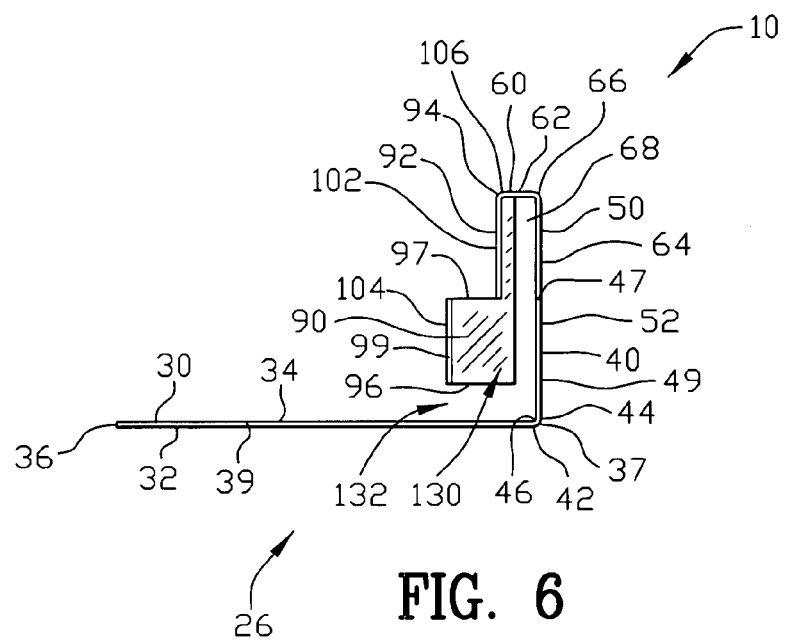
FIG. 6 is a rear view of FIG. 3.
Figure 7:
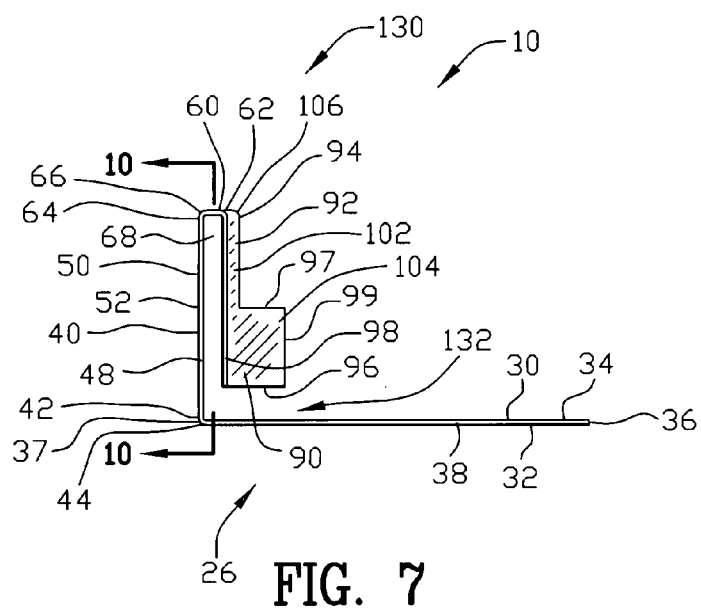
FIG. 7 is a front view of FIG. 3.
Figure 8:
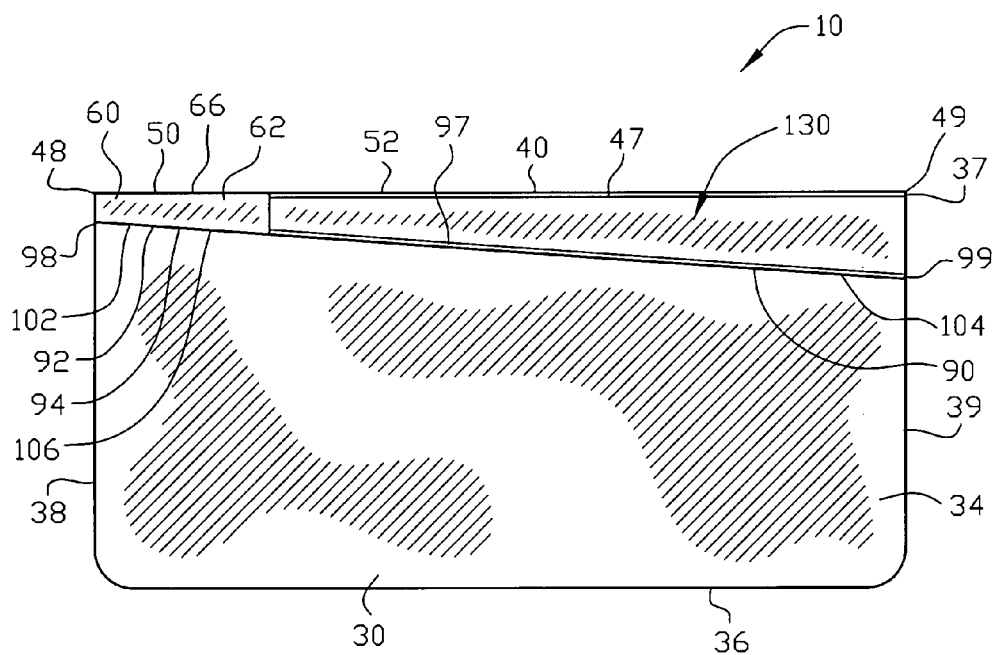
FIG. 8 is a top view of FIG. 3.
Figure 9:
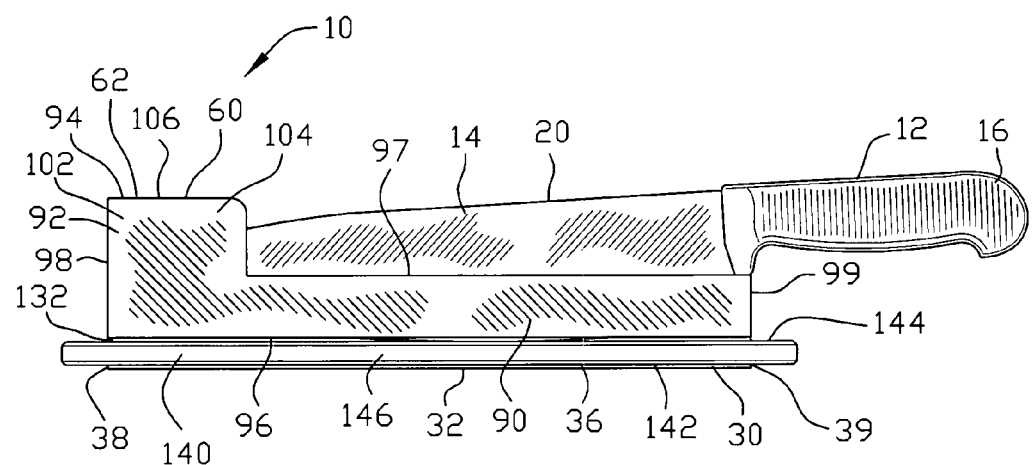
FIG. 9 is a left side view of FIG. 1.

A coupling member 60 is secured to the wall member 40 and extends substantially parallel and above the base 30. In the first embodiment of the receptacle 10 illustrated in FIGS. 1-10, the coupling member 60 includes a top coupling member 62. The top coupling member 62 is secured to the wall member 40. The top coupling member 62 may be secured to the second edge 47 of the wall member 40. If the wall extender 50 is included to form the L-shaped wall member 52, the top coupling member 62 may be secured to the wall extender 50. The wall member 40 and the top coupling member 62 may be constructed of an integral one piece unit 64 including a ninety degree bend 66 positioned between the wall member 40 and the top coupling member 62 for maintaining the top coupling member 62 substantially perpendicular to the wall member 40. The integral one piece unit 64 including the ninety degree bend 66 is constructed from a metallic material by bending sheet metal, metallic material by casting molten metal, polymeric material by injection molding, or other materials and forms of manufacturing. As best seen in FIGS. 6 and 7 the top coupling member 62 and the base engaging surface 34 define a cavity 68 for exposing the wall member 40.

Figure 11:
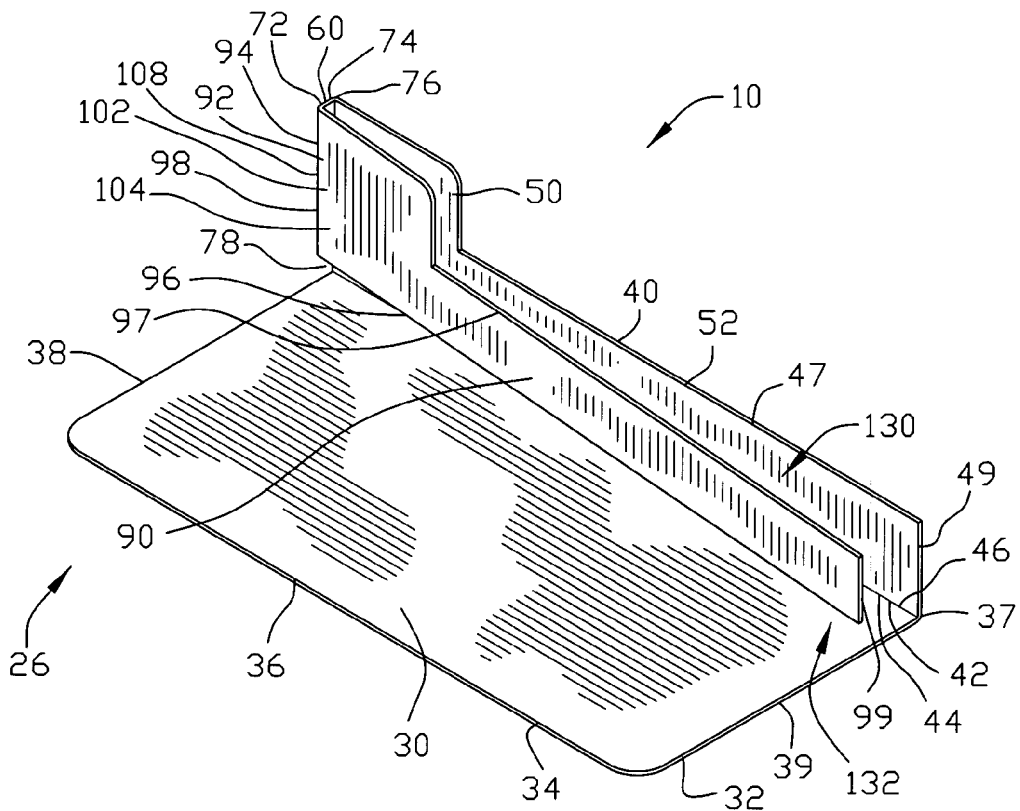
FIG. 11 is a left front isometric view of a second embodiment of the present invention.
Figure 12:
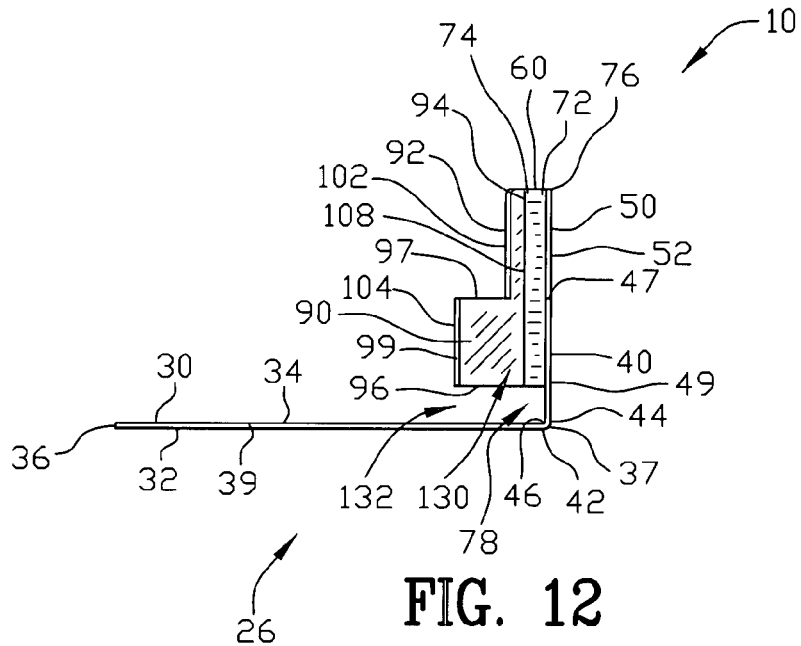
FIG. 12 is a rear view of FIG. 11.
Figure 13:
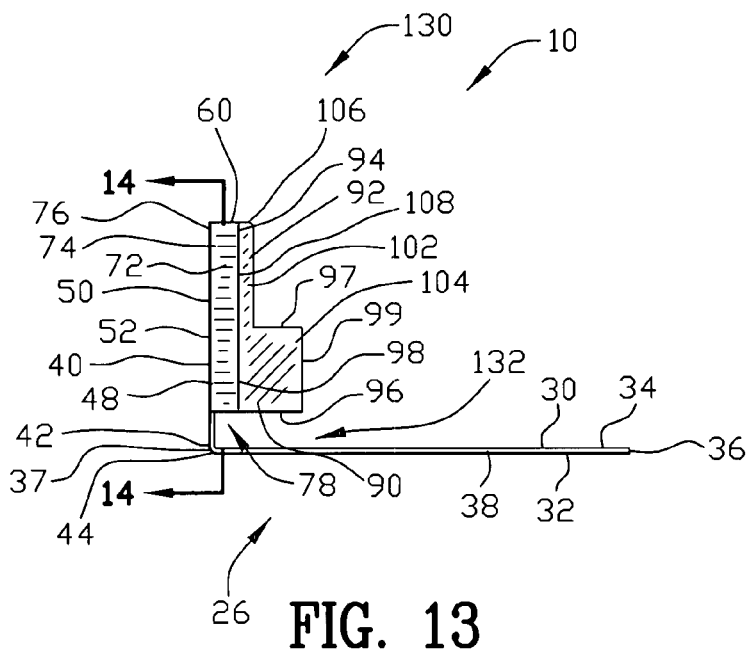
FIG. 13 is a front view of FIG. 11.

In the second embodiment of the receptacle 10 illustrated in FIGS. 11-14, the coupling member 60 includes a front coupling member 72. The front coupling member 72 is secured to the wall member 40. The front coupling member 72 may be secured to the third edge 48 of the wall member 40. If the wall extender 50 is included to form the L-shaped wall member 52, the front coupling member 72 may be secured to the wall extender 50. The wall member 40 and the front coupling member 72 may be constructed of an integral one piece unit 74 including a ninety degree bend 76 positioned between the wall member 40 and the front coupling member 72 for maintaining the front coupling member 72 substantially perpendicular to the wall member 40. The integral one piece unit 74 including the ninety degree bend 76 is constructed from a metallic material by bending sheet metal, metallic material by casting molten metal, polymeric material by injection molding, or other materials and forms of manufacturing. As best seen in FIGS. 11 and 12 the front coupling member 72 and the base engaging surface 34 define an opening 78 for exposing the wall member 40.

Figure 15:
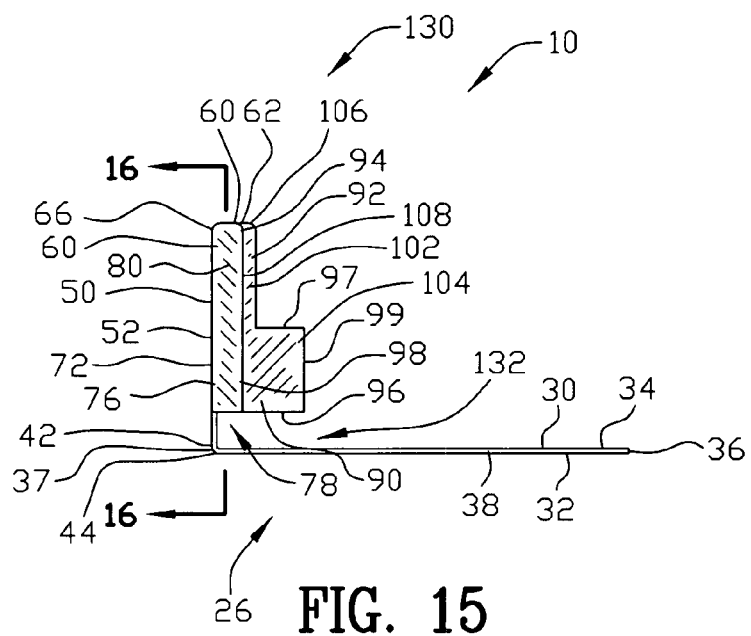
FIG. 15 is a front view of a third embodiment of the present invention.
Figure 16:
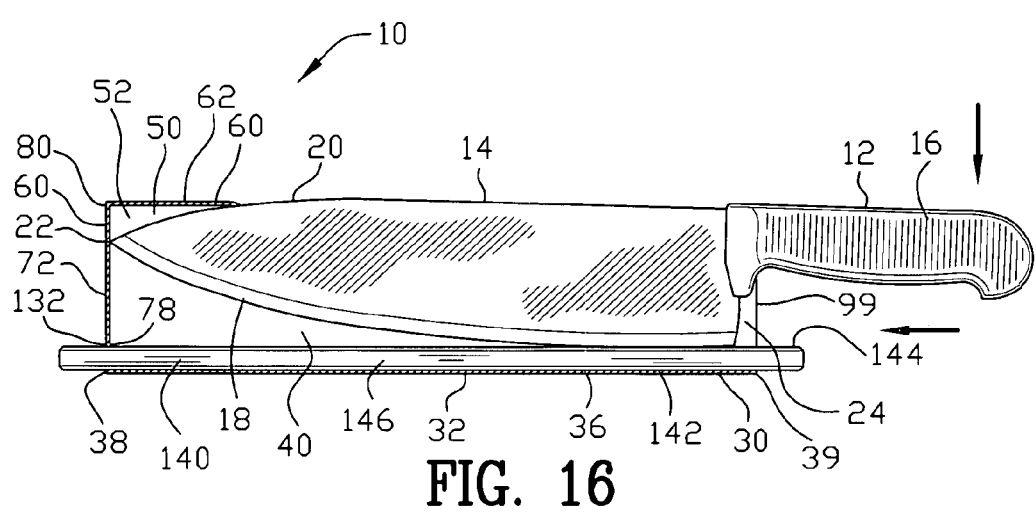
FIG. 16 is a sectional view along line 16-16 in FIG. 15 including a cutlery instrument.

In the third embodiment of the receptacle 10 illustrated in FIGS. 15-16, the coupling member 60 includes both the top coupling member 62 and the front coupling member 72. Both the top coupling member 62 and the front coupling member 72 are secured to the wall member 40. The top coupling member 62 may be secured to the second edge 47 of the wall member 40 and the front coupling member 72 may be secured to the third edge 48 of the wall member 40. If the wall extender 50 is included to form the L-shaped wall member 52, the top coupling member 62 and the front coupling member 72 may be secured to the wall extender 50. The wall member 40, the top coupling member 62 and the front coupling member 72 may be constructed of an integral one piece unit 80 including a first ninety degree bend 66 and a second ninety degree bend 76 positioned between the wall member 40 and the top coupling member 62 and the front coupling member 72 respectively. The integral one piece unit 80 including the first and second ninety degree bend 66 and 76 is constructed from a metallic material by bending sheet metal, metallic material by casting molten metal, polymeric material by injection molding, or other materials and forms of manufacturing. The top coupling member 62 and the base engaging surface 34 define a cavity 68 for exposing the wall member 40. The front coupling member 72 and the base engaging surface 34 define an opening 78 for exposing the wall member 40.

The receptacle 10 further comprises an arm member 90 secured to the coupling member 60. The arm member 90 extends substantially parallel to the wall member 40 and above the base 30. The coupling member 60 and the arm member 90 may be constructed of an integral one piece unit 92 including a ninety degree bend 94 positioned between the coupling member 60 and the arm member 90 for maintaining the arm member 90 substantially perpendicular to the coupling member 60. The integral one piece unit 92 including the ninety degree bend 94 is constructed from a metallic material by bending sheet metal, metallic material by casting molten metal, polymeric material by injection molding, or other materials and forms of manufacturing.

The arm member 90 is shown having a rectangle shape defined by a first edge 96, second edge 97, third edge 98 and fourth edge 99. However, the arm member 90 may include other geometric shapes and dimensions. The length of the arm member 90 may be equivalent to the length of the base 30 such that the third and fourth edges 98 and 99 of the arm member 90 are adjacent to the third and fourth edge 38 and 39 of the base 30 respectively. Alternatively, the length of the arm member 90 may be smaller or larger than the length of the base 30.

The arm member 90 is shown having an arm extender 102. The arm member 90 and arm extender 102 form a L-shape arm member 104. The L-shape arm member 104 is secured to the coupling member 60 and extends substantially perpendicular from the coupling member 60. The L-shape arm member 104 and coupling member 60 may be constructed of an integral one piece unit 92 including a ninety degree bend 94 for maintaining the L-shape arm member 104 substantially perpendicular to the coupling member 60. The integral one piece unit 92 including the ninety degree bend 94 is constructed from a metallic material by bending sheet metal, metallic material by casting molten metal, polymeric material by injection molding, or other materials and forms of manufacturing.

In the first embodiment of the receptacle 10 illustrated in FIGS. 1-10, the top coupling member 62 is secured to the arm member 90 by a first ninety degree bend 106. The top coupling member 62 may be secured to the second edge 97 of the arm member 90. If the arm extender 102 is included to form the L-shaped arm member 104, the top coupling member 62 may be secured to the arm extender 102. The arm member 90 and the top coupling member 62 may be constructed of an integral one piece unit 92 including a ninety degree bend 94 positioned between the arm member 90 and the top coupling member 62 for maintaining the arm member 90 substantially perpendicular to the coupling member 60. The integral one piece unit 92 including the ninety degree bend 94 is constructed from a metallic material by bending sheet metal, metallic material by casting molten metal, polymeric material by injection molding, or other materials and forms of manufacturing.

In the second embodiment of the receptacle 10 illustrated in FIGS. 11-14, the front coupling member 72 is secured to the arm member 90 by a second ninety degree bend 108. The front coupling member 72 may be secured to the third edge 98 of the arm member 90. If the arm extender 102 is included to form the L-shaped arm member 104, the front coupling member 72 may be secured to the arm extender 102. The arm member 90 and the front coupling member 72 may be constructed of an integral one piece unit 92 including a ninety degree bend 94 positioned between the arm member 90 and the front coupling member 72 for maintaining the arm member 90 substantially perpendicular to the coupling member 60. The integral one piece unit 92 including the ninety degree bend 94 is constructed from a metallic material by bending sheet metal, metallic material by casting molten metal, polymeric material by injection molding, or other materials and forms of manufacturing.

In the third embodiment of the receptacle 10 illustrated in FIGS. 15 & 16, both the top coupling member 62 and the front coupling member 72 are secured to the arm member 90. The top coupling member 62 may be secured to the second edge 97 of the arm member 90 and the front coupling member 72 may be secured to the third edge 98 of the arm member 90. If the arm extender 102 is included to form the L-shaped arm member 104, the top coupling member 62 and the front coupling member 72 may be secured to the arm extender 102. The arm member 90, the top coupling member 62 and the front coupling member 72 may be constructed of an integral one piece unit 92 including the first ninety degree bend 106 and a second ninety degree bend 108. The first ninety degree bend 106 is positioned between the arm member 90 and the top coupling member 62. The second ninety degree bend 108 is positioned between the arm member 90 and the front coupling member 72. The integral one piece unit 92 including the first and second ninety degree bends 106 and 108 are constructed from a metallic material by bending sheet metal, metallic material by casting molten metal, polymeric material by injection molding, or other materials and forms of manufacturing.

Figure 17:
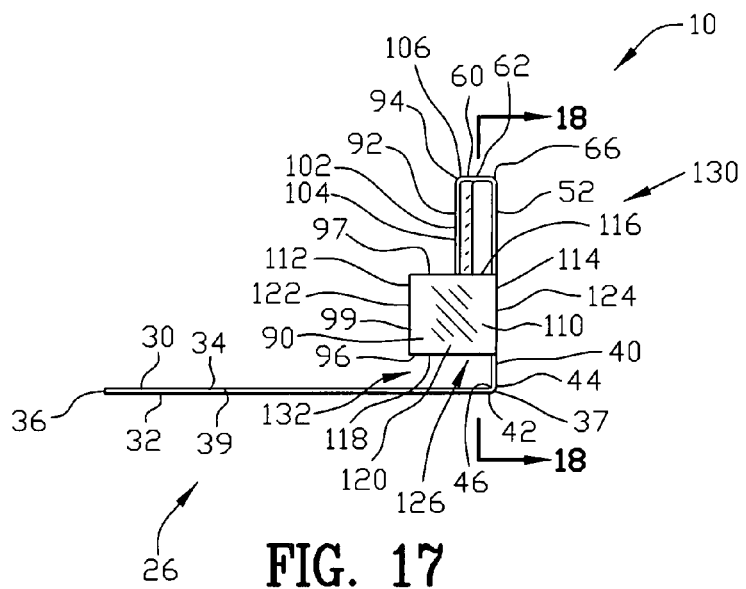
FIG. 17 is a rear view of a fourth embodiment of the present invention.
Figure 18:
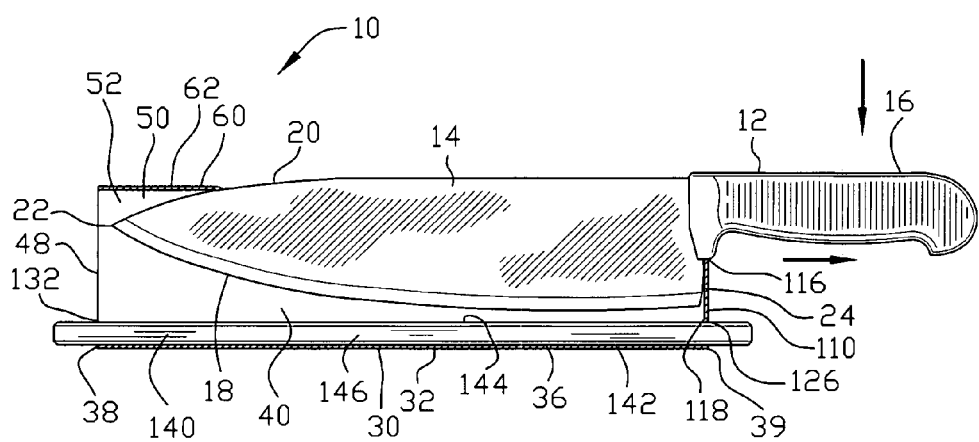
FIG. 18 is a sectional view along line 18-18 in FIG. 17 including a cutlery instrument.
Figure 19:
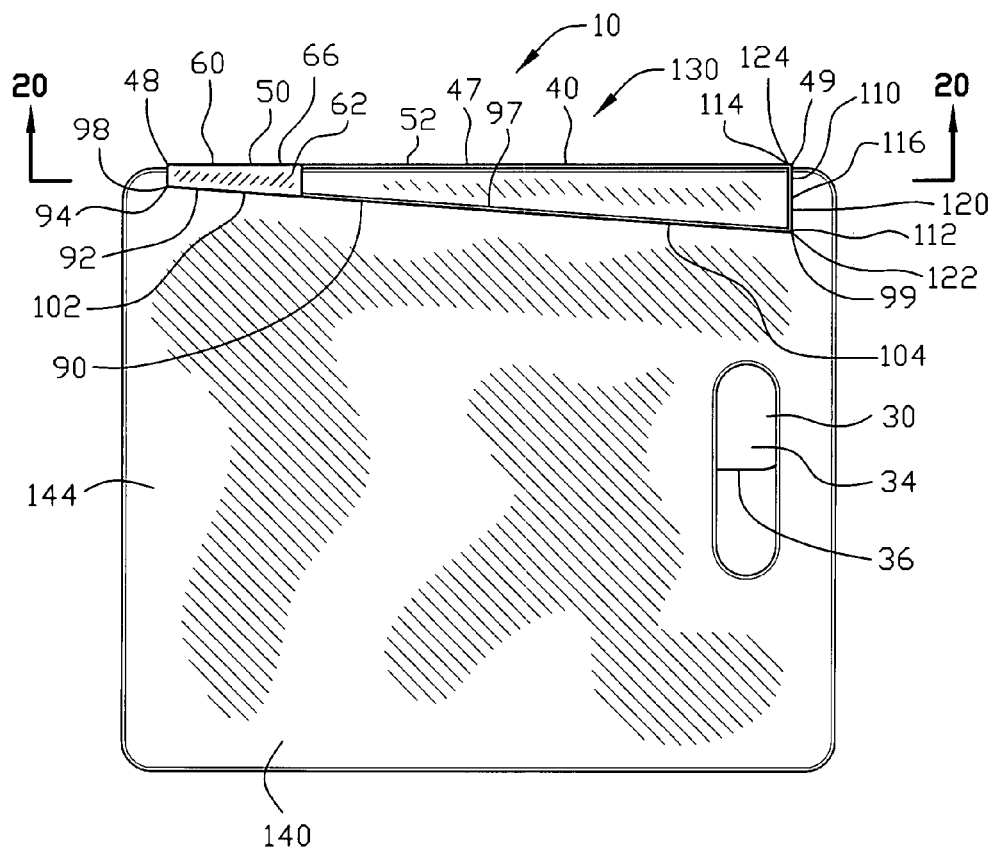
FIG. 19 is a top view of a fifth embodiment of the present invention.
Figure 20:
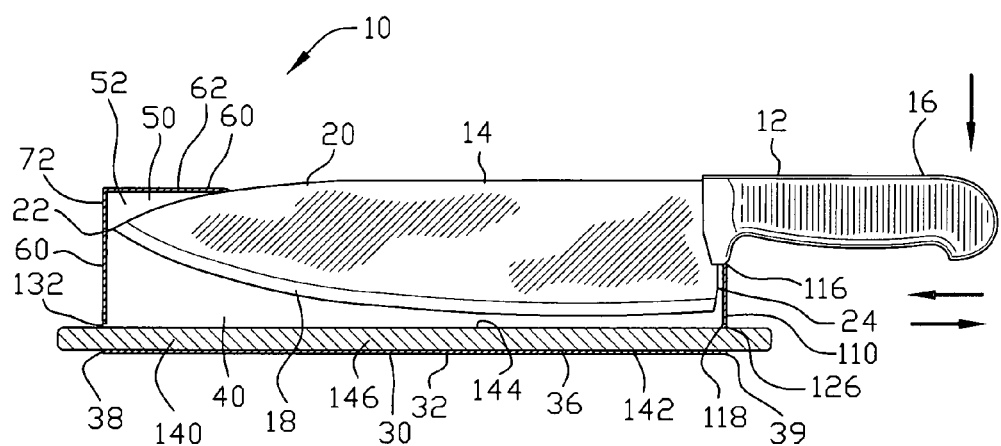
FIG. 20 is a sectional view along line 20-20 in FIG. 19 including a cutlery instrument.

In the fourth embodiment of the receptacle 10 illustrated in FIGS. 17 & 18 is similar to the first embodiment of the receptacle 10 illustrated in FIGS. 1-10 with the exception of the addition of a rear coupling member 110. In addition, the fifth embodiment of the receptacle 10 illustrated in FIGS. 19 & 20 is similar to the third embodiment of the receptacle 10 illustrated in FIGS. 15-16 with the exception of the addition of a rear coupling member 110. The rear coupling member 110 is shown having a rectangle shape defined by a first edge 112, second edge 114, third edge 116 and fourth edge 118. However, the wall 40 may include other geometric shapes and dimensions. The rear coupling member 110 is secured between the wall member 40 and the arm member 90.

The rear coupling member 110 may be secured between the fourth edge 99 of the arm member 90 and the fourth edge 49 of the wall member 40. The rear coupling member 110, the arm member 90 and the wall member 40 may be constructed of an integral one piece unit 120 including the first ninety degree bend 122 and a second ninety degree bend 124. The first ninety degree bend 122 is positioned between the fourth edge 99 of the arm member 90 and the first edge 112 of the rear coupling member 110. The second ninety degree bend 124 is positioned between the second edge 114 and the fourth edge 49 of the wall member 40. The integral one piece unit 120 including the first and second ninety degree bends 122 and 124 are constructed from a metallic material by bending sheet metal, metallic material by casting molten metal, polymeric material by injection molding, or other materials and forms of manufacturing.

A slit 130 is defined between the wall member 40 and the arm member 90 for receiving and maintaining the blade 14 of the cutlery instrument 12 in a static position. A slot 132 is defined between the arm member 90 and the base engaging surface 34 for exposing the wall member 40.

In the first embodiment of the receptacle 10 illustrated in FIGS. 1-10, the blade 14 of the cutlery instrument 12 is placed into a static position by inserting the blade 14 within the slit 130. During insertion of the blade 14 into the slit 130, the blade tip 22 must be maneuvered below the top coupling member 62. The base 30 may directly support the cutlery instrument 12 by positioning the blade edge 18 against the base engaging surface 34. The cutlery instrument 12 is prevented from tilting from a vertical position by the blade 14 contacting either the wall member 40 or the arm member 90. Alternatively, the cutlery instrument 12 may be prevented from tilting from a vertical position by the blade simultaneously contacting both the wall member 40 and the arm member 90.

To remove the cutlery instrument 12 from the receptacle 10, the handle 16 may either be pulled directly back until the blade 14 exits the slit 130 or the handle 16 may be simultaneously pulled up and back until the blade 14 exits the slit 130. As best seen in FIG. 10, a downward force applied to the handle 16 would cause the blade 14 to pivot at a point along the blade edge 18 and raise the blade tip 22. The top coupling member 62 prevents vertical displacement of the blade 14 in that the blade spine 20 strikes the top coupling member 62. The top coupling member 62 prevents removal of the cutlery instrument 12 from the receptacle 10 if a downward force is applied to the handle 16.

In the second embodiment of the receptacle 10 illustrated in FIGS. 11-14, the blade 14 of the cutlery instrument 12 is placed into a static position by inserting the blade 14 within the slit 130. The base 30 may directly support the cutlery instrument 12 by positioning the blade edge 18 against the base engaging surface 34. The cutlery instrument 12 is prevented from tilting from a vertical position by the blade 14 contacting either the wall member 40 or the arm member 90. Alternatively, the cutlery instrument 12 may be prevented from tilting from a vertical position by the blade simultaneously contacting both the wall member 40 and the arm member 90.

Figure 14:
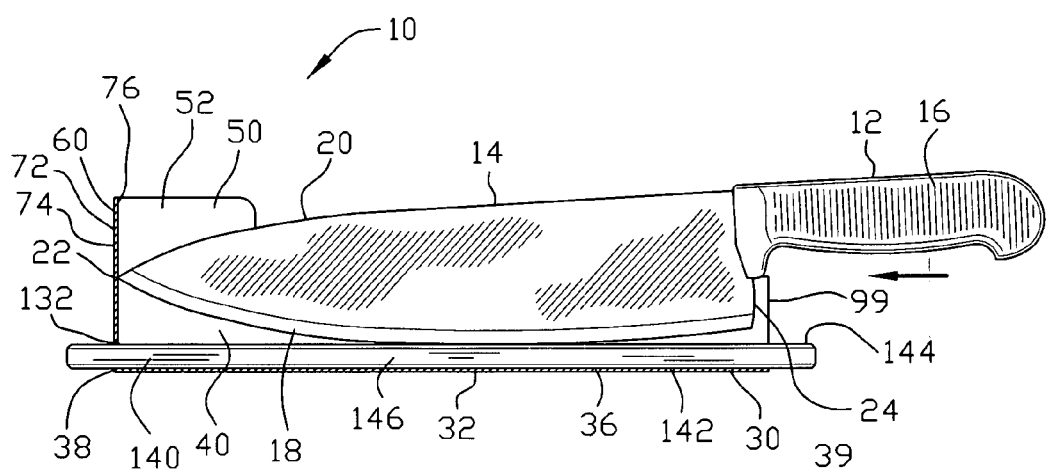
FIG. 14 is a sectional view along line 14-14 in FIG. 13 including a cutlery instrument.

To remove the cutlery instrument 12 from the receptacle 10, the handle 16 may be pulled directly back until the blade 14 exits the slit 130, the handle 16 may be simultaneously pulled up and back until the blade 14 exits the slit 130 or the handle 16 may be pulled directly up until the blade 14 exits the slit 130. As best seen in FIG. 14, a forward horizontal force applied to the handle 16 would cause the blade 14 to slide along the base engaging surface 34. The front coupling member 72 prevents a front horizontal displacement of the blade 14 in that the blade tip 22 strikes the front coupling member 72. The front coupling member 72 prevents removal of the cutlery instrument 12 from the receptacle 10 if a forward horizontal is applied to the handle 16.

In the third embodiment of the receptacle 10 illustrated in FIGS. 15 & 16, the blade 14 of the cutlery instrument 12 is placed into a static position by inserting the blade 14 within the slit 130. During insertion of the blade 14 into the slit 130, the blade tip 22 must be maneuvered below the top coupling member 62. The base 30 may directly support the cutlery instrument 12 by positioning the blade edge 18 against the base engaging surface 34. The cutlery instrument 12 is prevented from tilting from a vertical position by the blade 14 contacting either the wall member 40 or the arm member 90. Alternatively, the cutlery instrument 12 may be prevented from tilting from a vertical position by the blade simultaneously contacting both the wall member 40 and the arm member 90.

To remove the cutlery instrument 12 from the receptacle 10, the handle 16 may either be pulled directly back until the blade 14 exits the slit 130 or the handle 16 may be simultaneously pulled up and back until the blade 14 exits the slit 130. As best seen in FIG. 16, a downward force applied to the handle 16 would cause the blade 14 to pivot at a point along the blade edge 18 and raise the blade tip 22. The top coupling member 62 prevents vertical displacement of the blade 14 in that the blade spine 20 strikes the top coupling member 62. The top coupling member 62 prevents removal of the cutlery instrument 12 from the receptacle 10 if a downward force is applied to the handle 16.

In addition, a forward horizontal force applied to the handle 16 would cause the blade 14 to slide along the base engaging surface 34. The front coupling member 72 prevents a front horizontal displacement of the blade 14 in that the blade tip 22 strikes the front coupling member 72. The front coupling member 72 prevents removal of the cutlery instrument 12 from the receptacle 10 if a forward horizontal force is applied to the handle 16.

In the fourth embodiment of the receptacle 10 illustrated in FIGS. 17 & 18, the blade 14 of the cutlery instrument 12 is placed into a static position by inserting the blade 14 within the slit 130. During insertion of the blade 14 into the slit 130, the blade tip 22 must be maneuvered below the top coupling member 62 and above the rear coupling member 110. The base 30 may directly support the cutlery instrument 12 by positioning the blade edge 18 against the base engaging surface 34. The cutlery instrument 12 is prevented from tilting from a vertical position by the blade 14 contacting either the wall member 40 or the arm member 90. Alternatively, the cutlery instrument 12 may be prevented from tilting from a vertical position by the blade simultaneously contacting both the wall member 40 and the arm member 90.

To remove the cutlery instrument 12 from the receptacle 10, the handle 16 must be first be pulled up until the blade heel 24 is over the rear coupling member 110 and next back until the blade tip clears the top coupling member 62. As best seen in FIG. 18, a downward force applied to the handle 16 would cause the blade 14 to pivot at a point along the blade edge 18 and raise the blade tip 22. The top coupling member 62 prevents vertical displacement of the blade 14 in that the blade spine 20 strikes the top coupling member 62. The top coupling member 62 prevents removal of the cutlery instrument 12 from the receptacle 10 if a downward force is applied to the handle 16.

In addition, a backwards horizontal force applied to the handle 16 would cause the blade 14 to slide along the base engaging surface 34. The rear coupling member 110 prevents a backwards horizontal displacement of the blade 14 in that the blade heel 24 strikes the rear coupling member 110. The rear coupling member 110 prevents removal of the cutlery instrument 12 from the receptacle 10 if a backwards horizontal force is applied to the handle 16.

In the fifth embodiment of the receptacle 10 illustrated in FIGS. 19 & 20, the blade 14 of the cutlery instrument 12 is placed into a static position by inserting the blade 14 within the slit 130. During insertion of the blade 14 into the slit 130, the blade tip 22 must be maneuvered below the top coupling member 62 and above the rear coupling member 110. The base 30 may directly support the cutlery instrument 12 by positioning the blade edge 18 against the base engaging surface 34. The cutlery instrument 12 is prevented from tilting from a vertical position by the blade 14 contacting either the wall member 40 or the arm member 90. Alternatively, the cutlery instrument 12 may be prevented from tilting from a vertical position by the blade simultaneously contacting both the wall member 40 and the arm member 90.

To remove the cutlery instrument 12 from the receptacle 10, the handle 16 must be first be pulled up until the blade heel 24 is over the rear coupling member 110 and next back until the blade tip clears the top coupling member 62. As best seen in FIG. 20, a downward force applied to the handle 16 would cause the blade 14 to pivot at a point along the blade edge 18 and raise the blade tip 22. The top coupling member 62 prevents vertical displacement of the blade 14 in that the blade spine 20 strikes the top coupling member 62. The top coupling member 62 prevents removal of the cutlery instrument 12 from the receptacle 10 if a downward force is applied to the handle 16.

A forward horizontal force applied to the handle 16 would cause the blade 14 to slide along the base engaging surface 34. The front coupling member 72 prevents a front horizontal displacement of the blade 14 in that the blade tip 22 strikes the front coupling member 72. The front coupling member 72 prevents removal of the cutlery instrument 12 from the receptacle 10 if a forward horizontal force is applied to the handle 16.

In addition, a backwards horizontal force applied to the handle 16 would cause the blade 14 to slide along the base engaging surface 34. The rear coupling member 110 prevents a backwards horizontal displacement of the blade 14 in that the blade heel 24 strikes the rear coupling member 110. The rear coupling member 110 prevents removal of the cutlery instrument 12 from the receptacle 10 if a backwards horizontal force is applied to the handle 16.

The receptacle 10 as illustrated in FIGS. 1, 2, 9, 10, 14, 16, 18 and 20 may engage a cutlery board 140. The cutlery board 140 may be constructed from wood, polymeric material or other rigid material. The cutlery board 140 has a board support surface 142, a board engaging surface 144, a first edge 146 and a second edge 148. The board support surface 142 provides a surface for resting on an ambient surface 26. The board support surface 142 may rest upon base engaging surface 34. The weight of the cutlery board 140 upon the base engaging surface 34 may serve to prevent movement of the receptacle 10. The board engaging surface 144 provides a surface for cutting and preparing foods. The board engaging surface is resistant to scratching and cutting from contact of the blade edge 18.

The slot 132 defined between the arm member 90 and the base engaging surface 34 permits the cutlery board 140 to traverse below the arm member 90 to be positioned under the slit 130. The cavity 68 defined between the top coupling member 62 and the base engaging surface 34 further permits the cutlery board 140 to traverse below the arm member 90 to be positioned under the slit 130. The opening 78 defined between the front coupling member 72 and the base engaging surface 34 also permits the cutlery board 140 to traverse below the arm member 90 to be positioned under the slit 130. Finally, the orifice 126 defined between the rear coupling member 110 and the base engaging surface 34 permits the cutlery board 140 to traverse below the arm member 90 to be positioned under the slit 130. Preferably, the second edge 148 of the cutlery board 140 traverses below the arm member 90 and is positioned adjacent to the wall member 40.

Upon placement of the cutlery instrument 12 into the slit 130, the blade edge 18 is positioned upon the board engaging surface 144. As such, the cutlery board 140 may directly support the cutlery instrument 12 with the receptacle 10 retaining the cutlery instrument 12 in a static vertical position.

Figure 21:
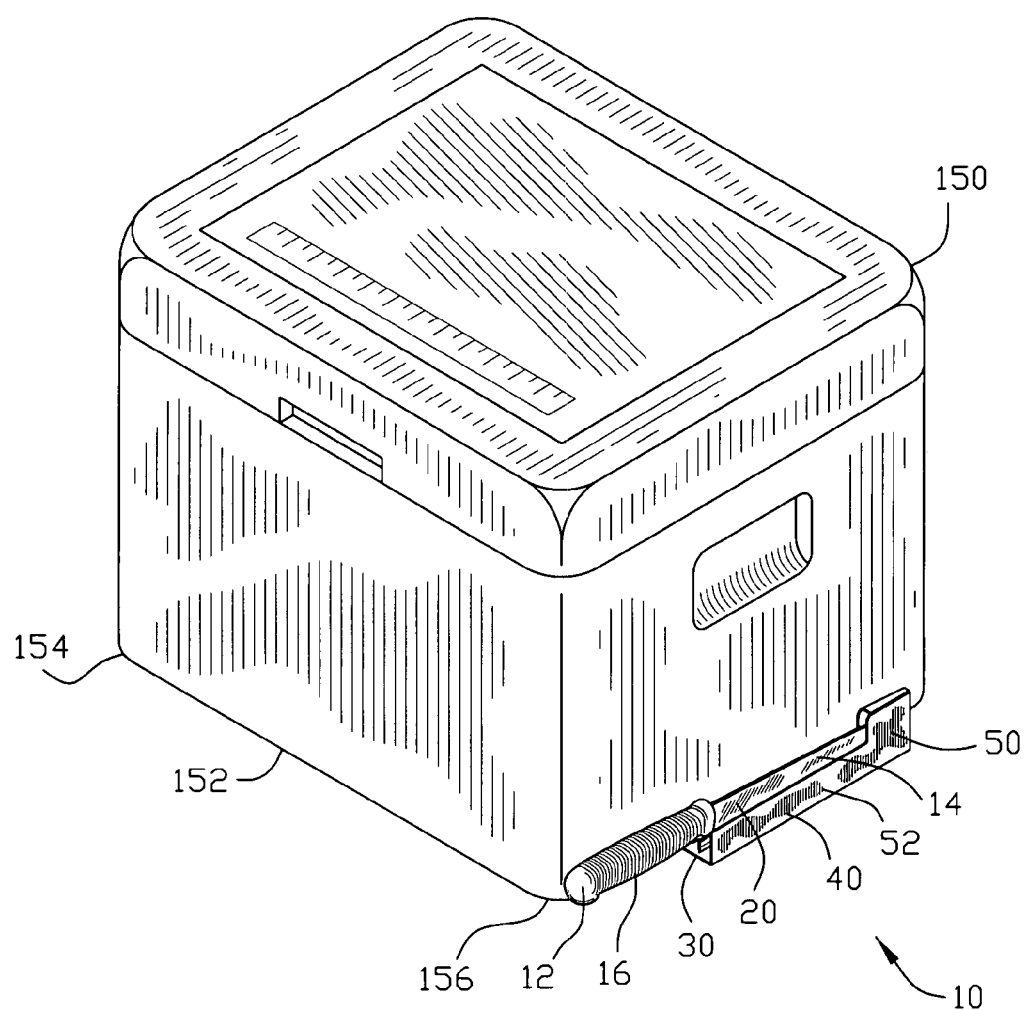
FIG. 21 is a rear isometric view of a receptacle for retaining a cutlery instrument engaging a container.
Figure 22:
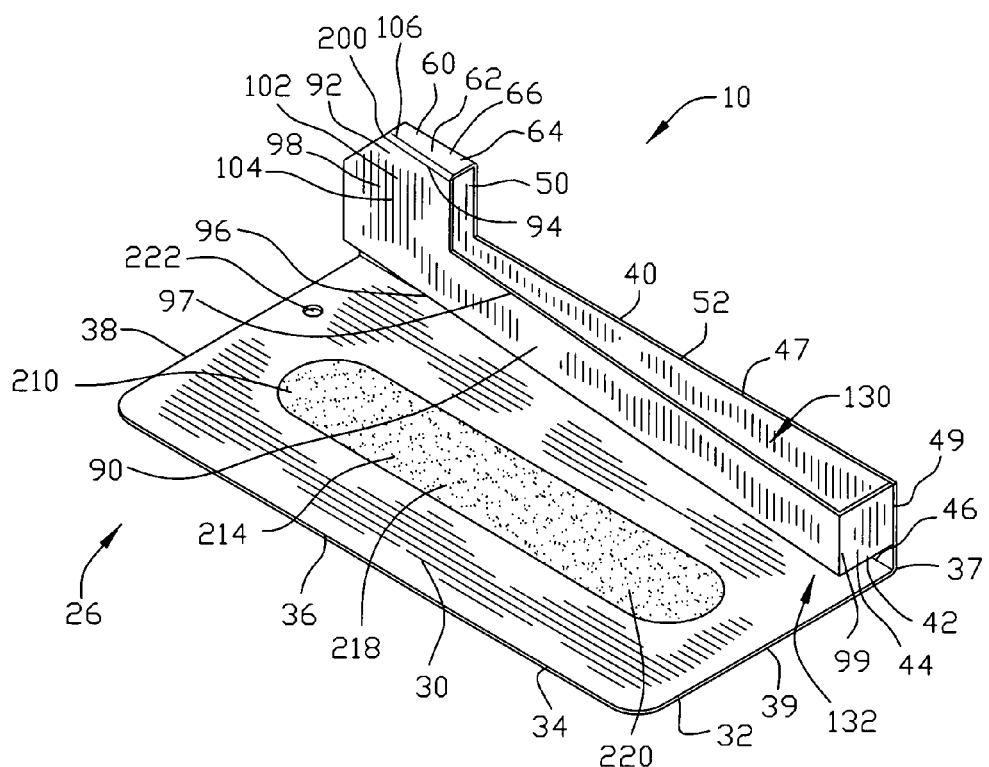
FIG. 22 is a left front isometric view of a sixth embodiment of the present invention.
Figure 23:
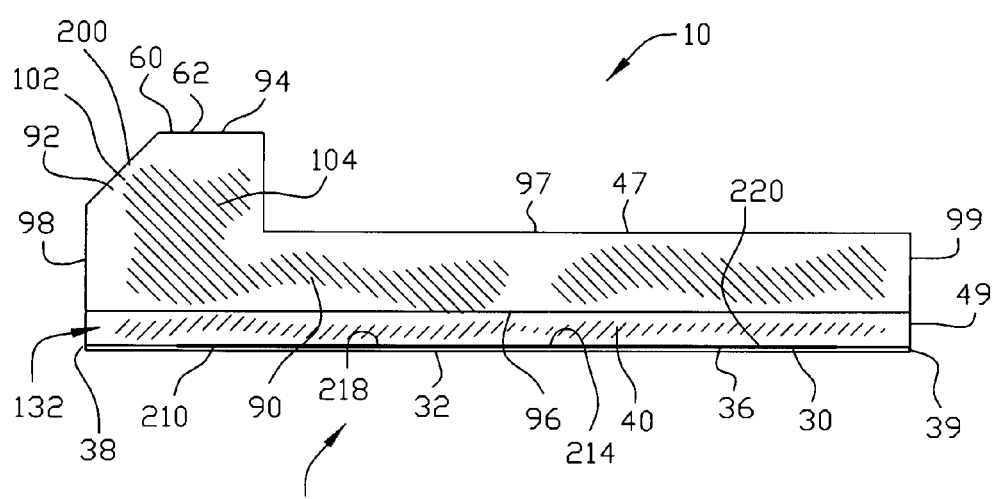
FIG. 23 is a left side view of FIG. 22.
Figure 24:
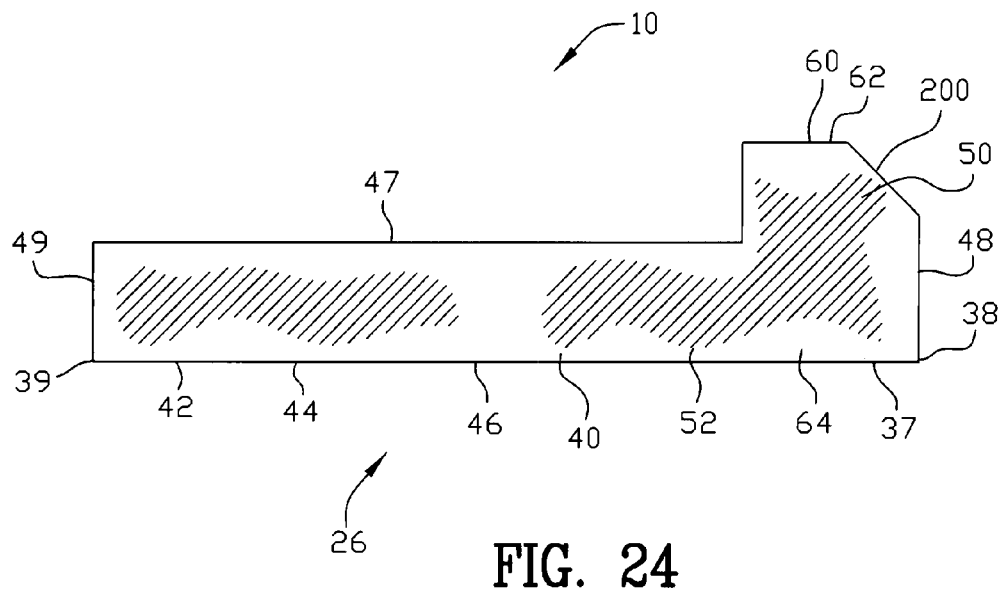
FIG. 24 is a right side view of FIG. 22.
Figure 25:
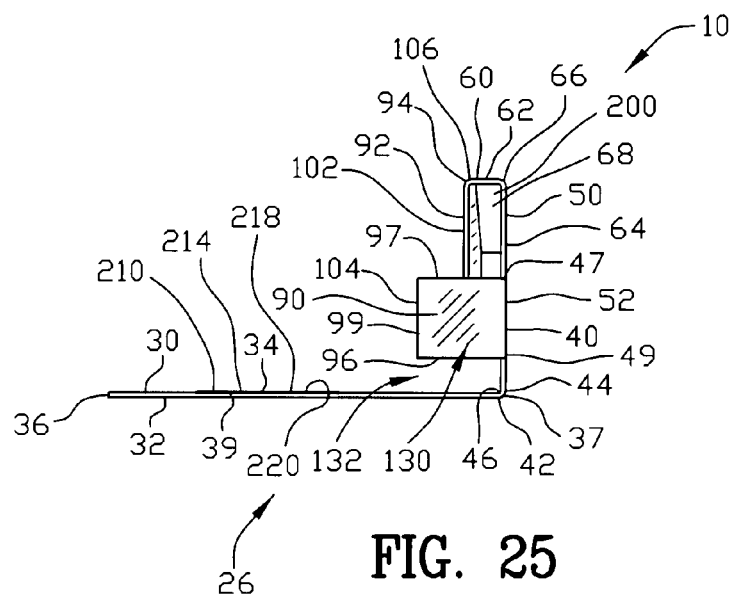
FIG. 25 is a rear view of FIG. 22.
Figure 26:
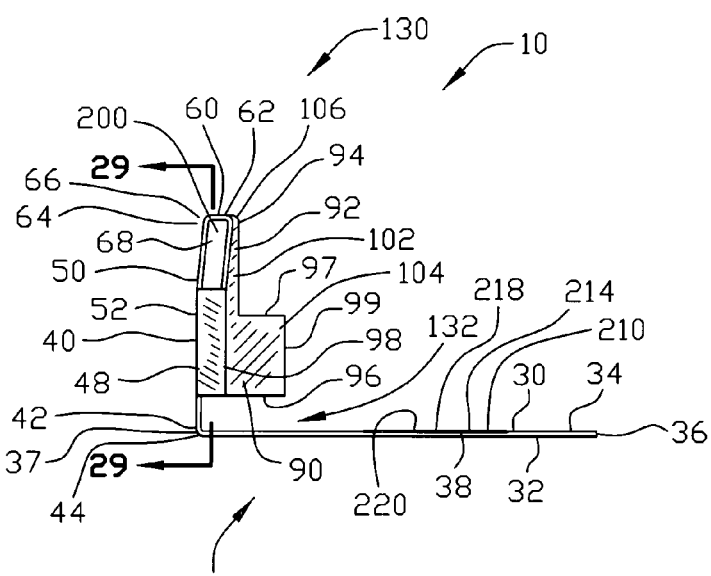
FIG. 26 is a front view of FIG. 22.
Figure 27:
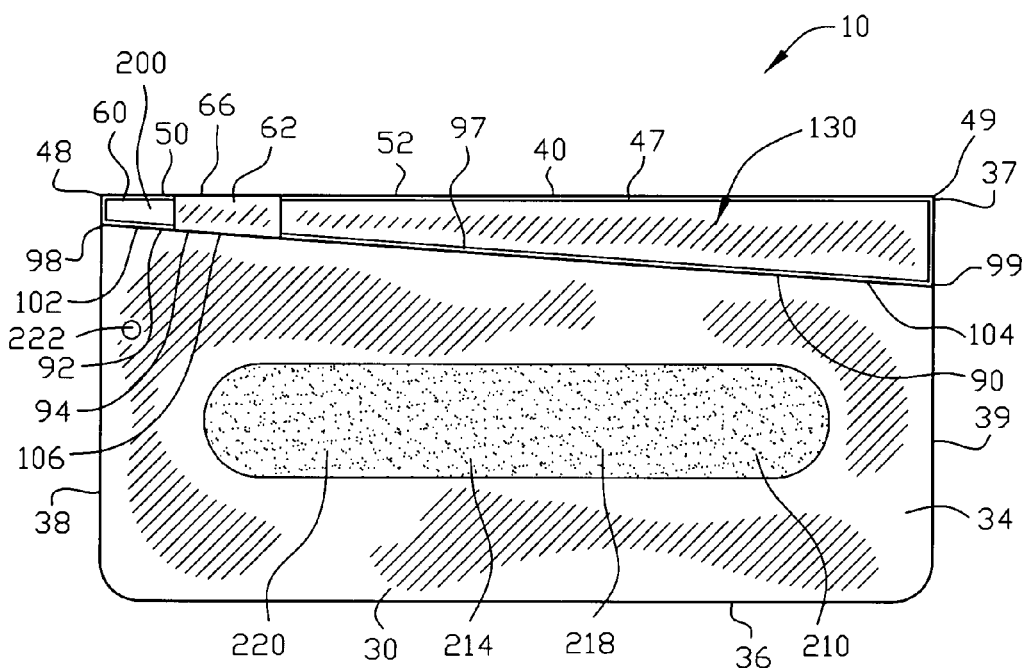
FIG. 27 is a top view of FIG. 22.

The receptacle 10 as illustrated in FIG. 21 may engage a cooler 150. The cooler 150 has a cooler supporting surface 152, a first edge 154 and a second edge 156. The cooler support surface 152 provides a surface for resting on an ambient surface 26. The cooler support surface 152 may rest upon base engaging surface 34. The weight of the cooler 150 upon the base engaging surface 34 may serve to prevent movement of the receptacle 10. The cooler 150 provides an insulated storage for foods.

Preferably, the second edge 156 of the cooler 150 is positioned adjacent to the arm member 90. Upon placement of the cutlery instrument 12 into the slit 130, the blade edge 18 is positioned upon the base engaging surface 34. As such, the base 30 may directly support the cutlery instrument 12 with the wall member 40 and the arm member 90 retaining the cutlery instrument 12 in a static vertical position.

FIGS. 22-32 illustrate a sixth embodiment of the present invention. The sixth embodiment includes an aperture 200 positioned between the coupling member 60, top coupling member 62, arm extender 102 and the wall extender 50. The slit 130, slot 132 and aperture 200 permits access within the cavity 68 for cleaning and sterilizing.

The base engaging surface 34 of the base 30 includes a non-skid pad 210 for positioning adjacent to the cutlery board 140. The nonskid pad 210 increases the horizontal frictional force between the cutlery board 140 and the base engaging surface 34 of the base 30 for preventing displacement of the cutlery board 140 relative to the receptacle 10. The nonskid pad 210 may be constructed of a synthetic rubber, a polymeric or other nonskid material. The nonskid pad 210 includes a pad base surface 212 and a pad engaging surface 214. The pad base surface 212 may include an adhesive layer 216 for securing the nonskid pad 210 to the base engaging surface 34. The pad engaging surface 214 may include a texturize surface 218 for improving the frictional force between the cutlery board 140 and the nonskid pad 210. The nonskid pad 210 is shown to have a circumference defining an elongated strip 220. However, the nonskid pad 20 may include other shapes, and also may cover the entire base engaging surface 34.

The base 30 may also include a storage bore 222 traversing from the base engaging surface 34 to the base support surface 32. The storage bore 222 facilitates storing the receptacle 10 in a vertical orientation from a hanging member 224 secured a vertical surface 226. The storage bore 222 is shown to be positioned adjacent to the third edge 38. However, the storage bore 222 may be positioned anywhere on the base 30.

Figure 28:
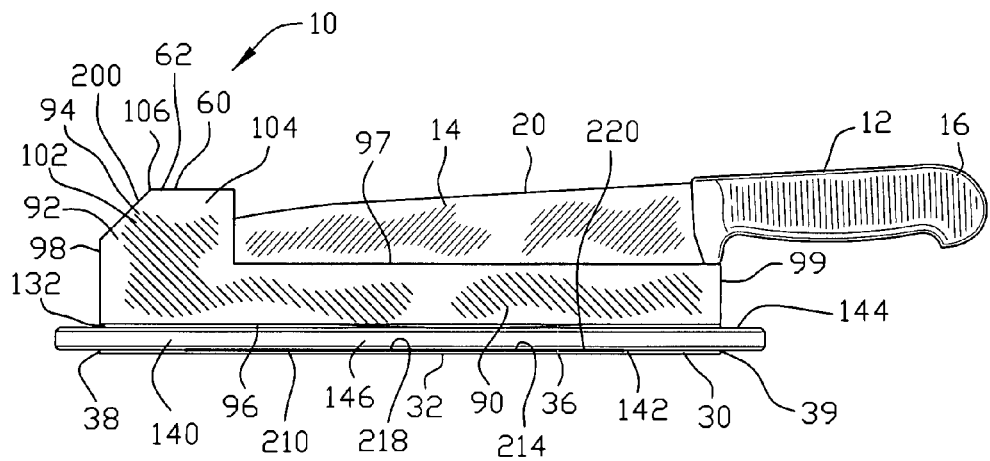
FIG. 28 is a left side view similar to FIG. 22 including a cutlery instrument and a cutlery board.
Figure 29:
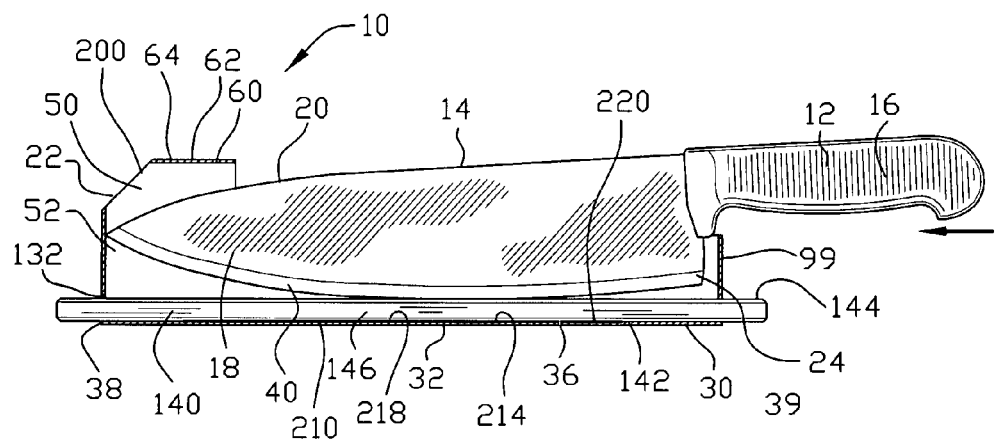
FIG. 29 is a sectional view along line 29-29 in FIG. 26 including a cutlery instrument and a cutlery board illustrating a horizontal force applied to the cutlery instrument.
Figure 30:
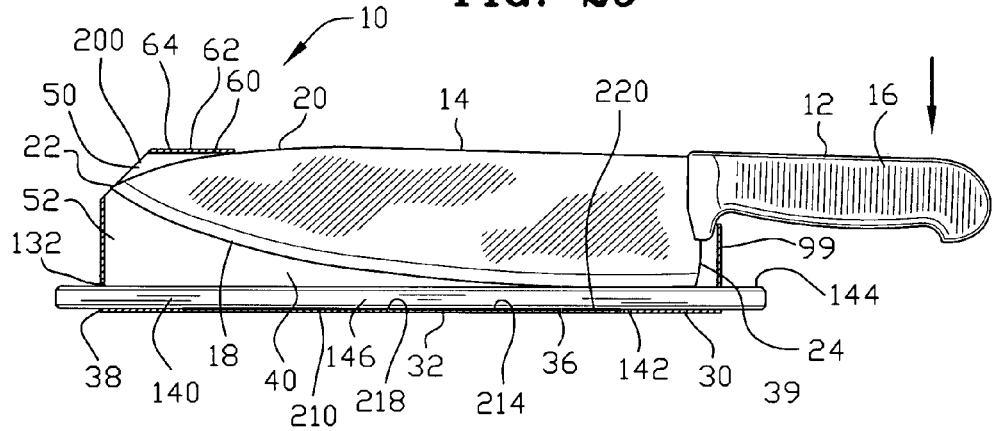
FIG. 30 is a sectional view along line 29-29 in FIG. 26 including a cutlery instrument and a cutlery board illustrating a vertical force applied to the cutlery instrument.
Figure 31:
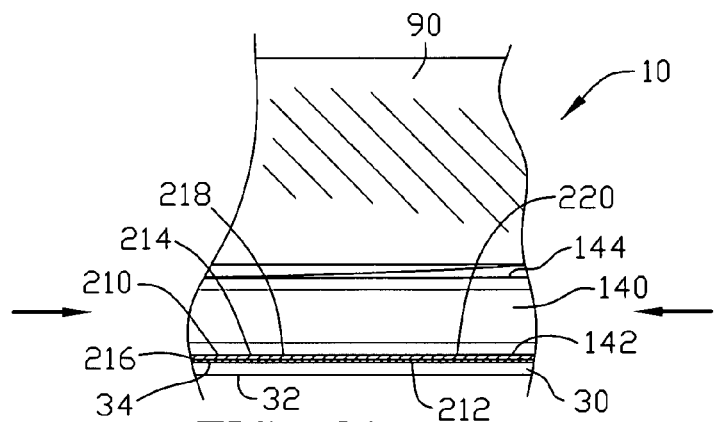
FIG. 31 is an enlarged portion of FIG. 28.
Figure 32:
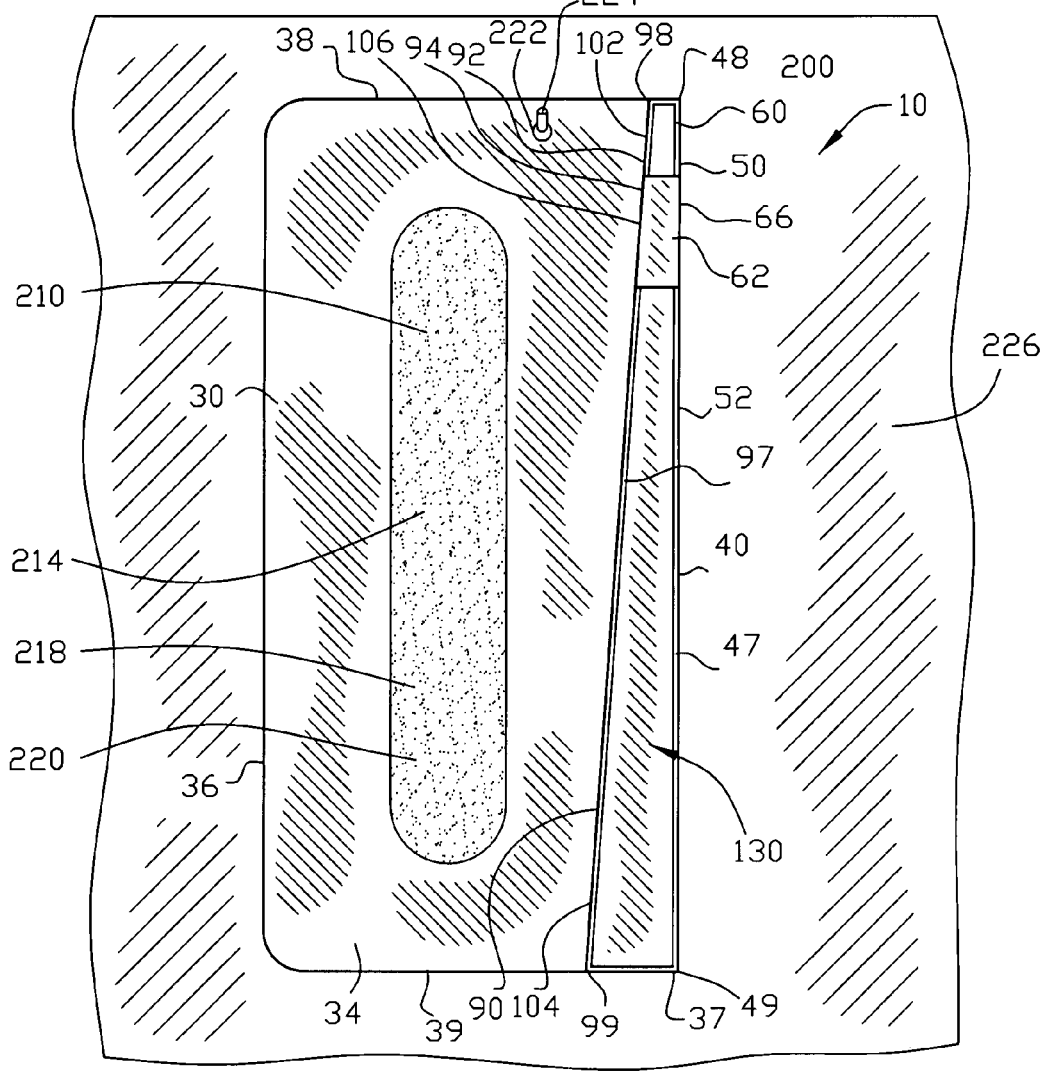
FIG. 32 is a view similar to FIG. 27 illustrating the present invention hanging from vertical surface.

As best seen in FIGS. 28-30, the blade 14 of the cutlery instrument 12 is placed into a static position by inserting the blade 14 within the slit 130. During insertion of the blade 14 into the slit 130, the blade tip 22 must be maneuvered below the top coupling member 62 and above the rear coupling member 110. The base 30 may directly support the cutlery instrument 12 by positioning the blade edge 18 against the base engaging surface 34. The cutlery instrument 12 is prevented from tilting from a vertical position by the blade 14 contacting either the wall member 40 or the arm member 90. Alternatively, the cutlery instrument 12 may be prevented from tilting from a vertical position by the blade simultaneously contacting both the wall member 40 and the arm member 90.

To remove the cutlery instrument 12 from the receptacle 10, the handle 16 must be first be pulled up until the blade heel 24 is over the rear coupling member 110 and next back until the blade tip clears the top coupling member 62. As best seen in FIG. 30, a downward force applied to the handle 16 would cause the blade 14 to pivot at a point along the blade edge 18 and raise the blade tip 22. The top coupling member 62 prevents vertical displacement of the blade 14 in that the blade spine 20 strikes the top coupling member 62. The top coupling member 62 prevents removal of the cutlery instrument 12 from the receptacle 10 if a downward force is applied to the handle 16.

As best seen in FIG. 29, a forward horizontal force applied to the handle 16 would cause the blade 14 to slide along the base engaging surface 34. The front coupling member 72 prevents a front horizontal displacement of the blade 14 in that the blade tip 22 strikes the front coupling member 72. The front coupling member 72 prevents removal of the cutlery instrument 12 from the receptacle 10 if a forward horizontal force is applied to the handle 16. Both the top coupling member 62 and the front coupling member 72 restrict the blade 14 from traversing through the aperture 200 upon a combined downward force and forward horizontal force applied to the handle 16.

In addition, a backwards horizontal force applied to the handle 16 would cause the blade 14 to slide along the base engaging surface 34. The rear coupling member 110 prevents a backwards horizontal displacement of the blade 14 in that the blade heel 24 strikes the rear coupling member 110. The rear coupling member 110 prevents removal of the cutlery instrument 12 from the receptacle 10 if a backwards horizontal force is applied to the handle 16.

Figure 33:
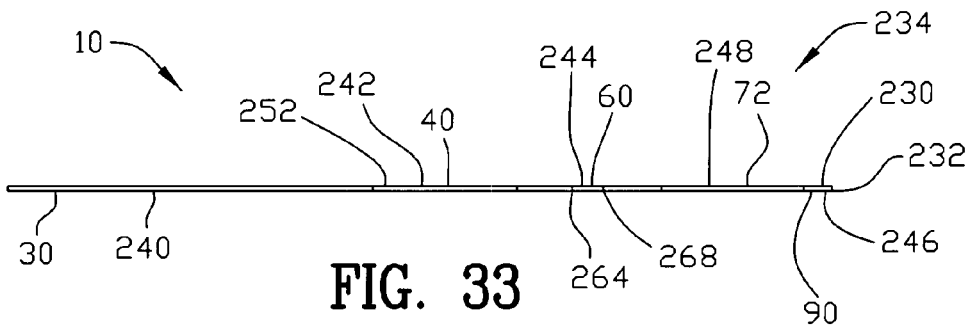
FIG. 33 is a side view of a plate material utilized to construct the present invention.
Figure 34:
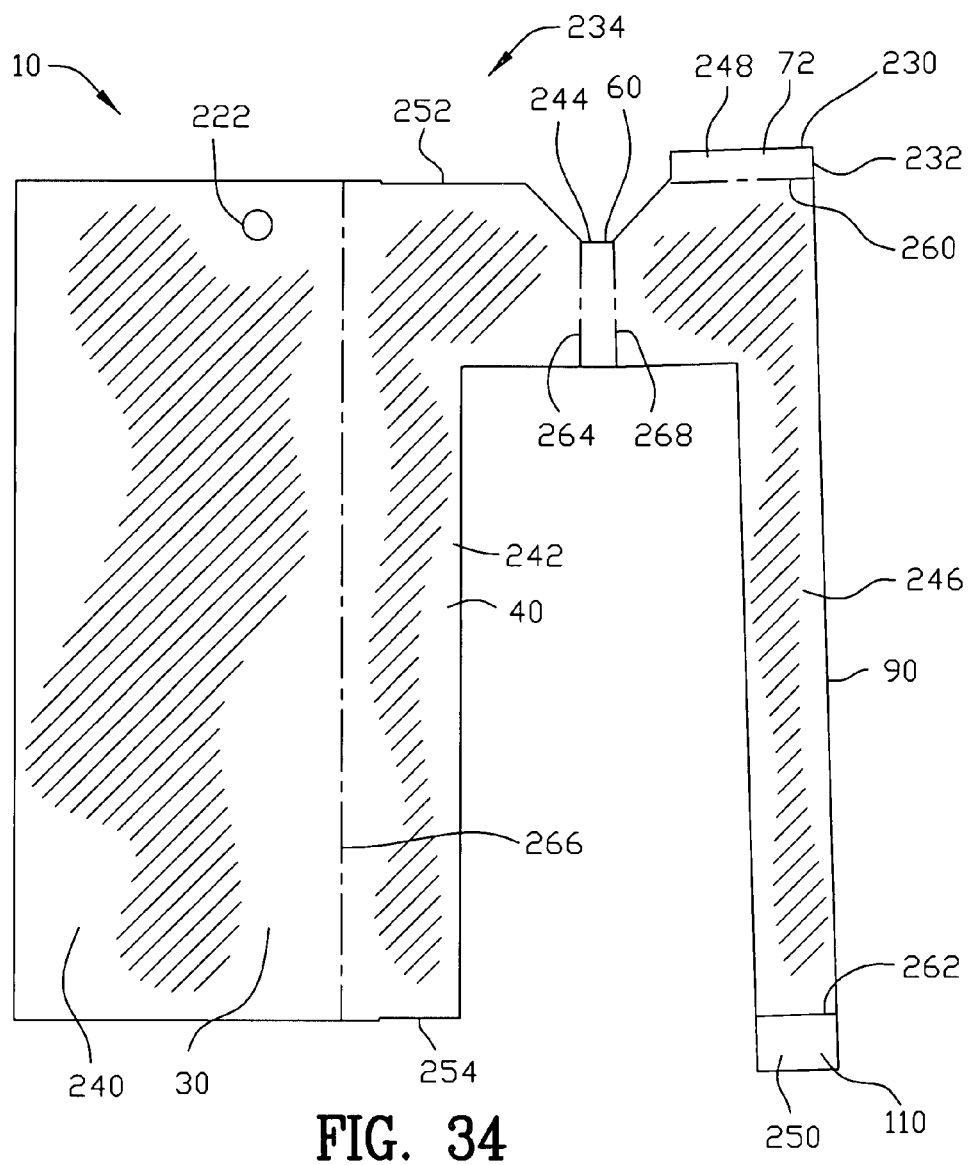
FIG. 34 is a top view of FIG. 33.
Figure 35:
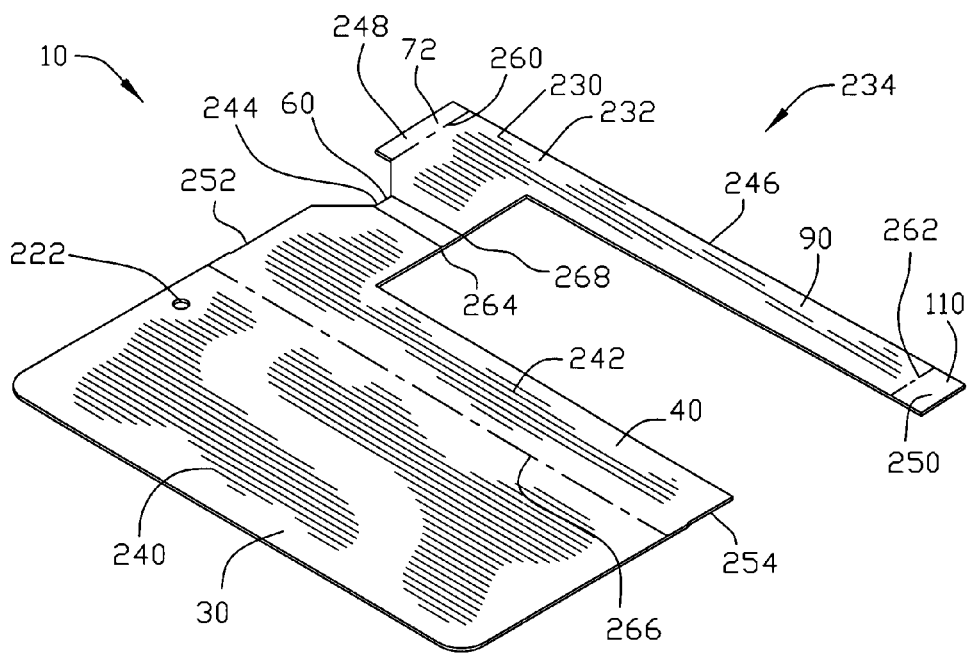
FIG. 35 is an isometric view of FIG. 34.

FIGS. 33-40 illustrate the process of construction of the present invention. As best seen in FIGS. 33-35, the apparatus 10 may be constructed from a plate material 230. The plate material 230 may be polymeric, metallic or other rigid material. Preferably the plate material 230 is constructed from a stainless steel plate 232. The stainless steel plate 232 may be cut, stamped or molded into a receptacle pattern 234 as best seen in FIGS. 34 and 35.

The plate material 230 comprises a base plate 240 for creating the base 30. A wall plate 242 creates the wall member 40. A coupling member plate 244 creates the coupling member 60. An arm member plate 246 creates the arm member 90. A front coupling member plate 248 creates the front coupling member 72. A rear coupling member plate 250 creates the rear coupling member 110. The base plate 240, wall plate 242, coupling member plate 244, arm member plate 246, front coupling member plate 248 and rear coupling member plate 250 are constructed of an integral one piece unit.

The wall plate 242 includes a front notch 252 and a rear notch 254. Both the front notched 252 and the rear notched 254 have a depth equivalent to the thickness of the plate material 230. The front notched 252 receives the front coupling member plate 248 such that the front coupling member plate 248 is not protruding out from the wall member 40. The rear notch 254 receives the rear coupling member plate 250 such that the rear coupling member plate 250 is not protruding out from the wall member 40.

Figure 36:
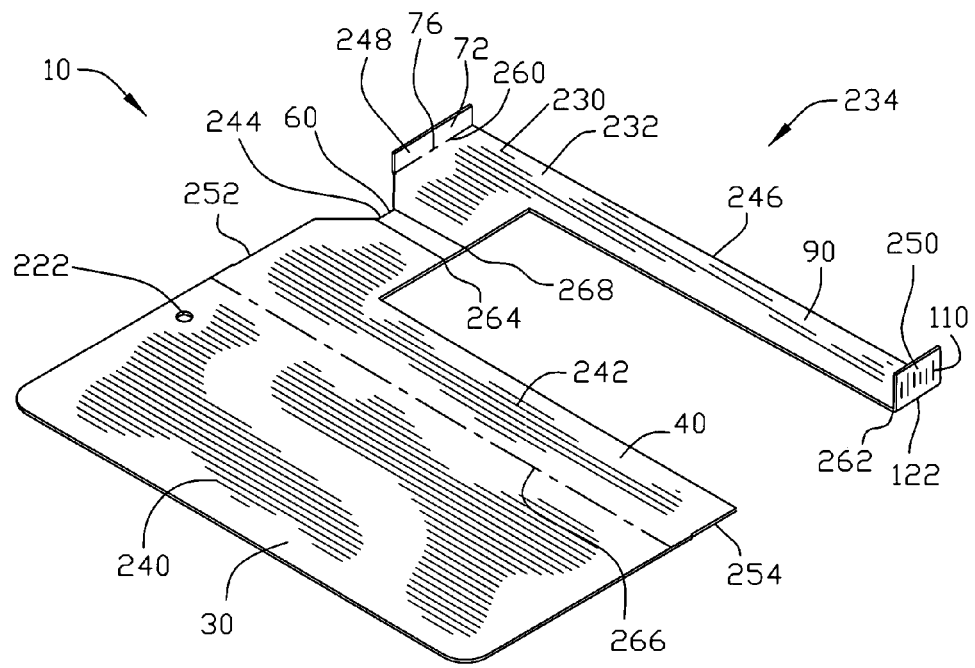
FIG. 36 is a view similar to FIG. 35 illustrating a first and a second bend to construct the present invention.

As best seen in FIG. 36, the receptacle 10 is constructed by first bending the front coupling member plate 248 ninety degrees (90°) upon a front coupling line 260 for defining the ninety degree bend 76. The rear coupling member plate 250 is also bent ninety degrees (90°) upon a rear coupling line 262 for defining the ninety degree bend 122.

Figure 37:
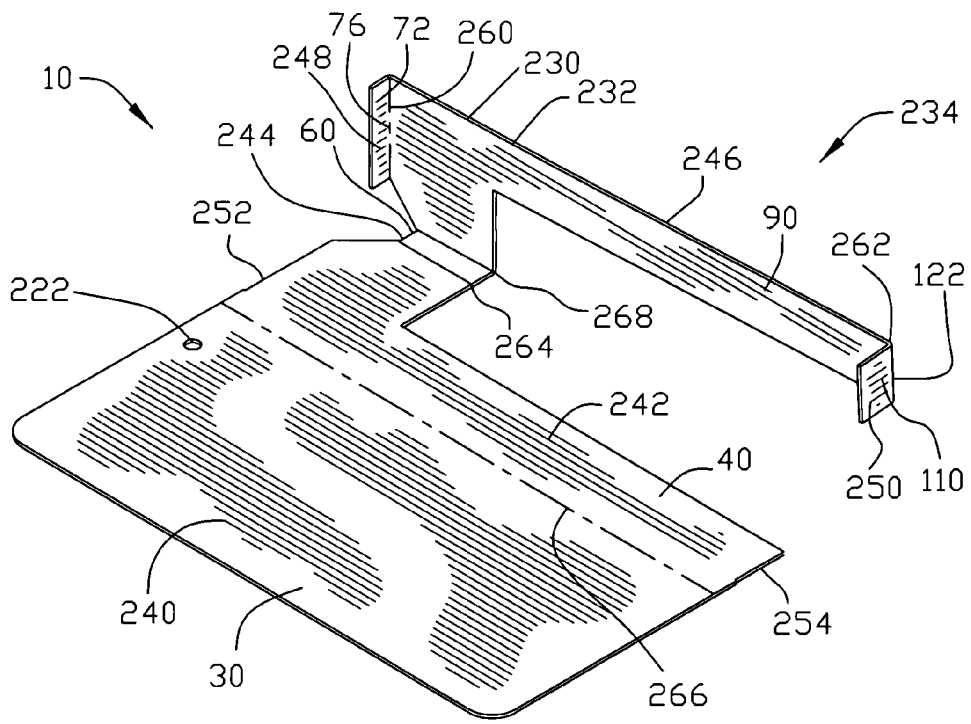
FIG. 37 is a view similar to FIG. 36 illustrating a third bend to construct the present invention.
Figure 38:
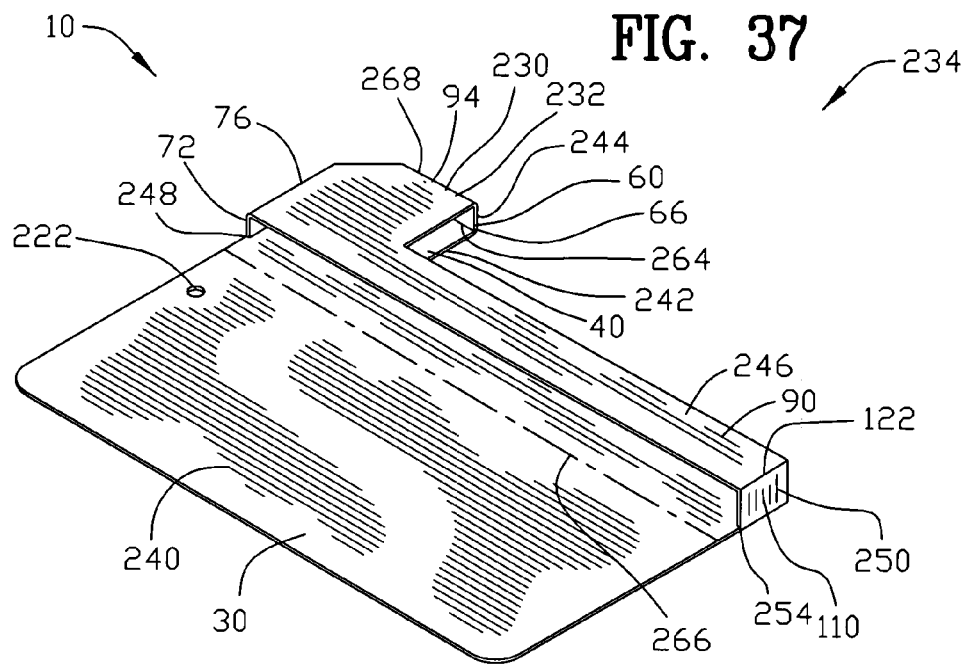
FIG. 38 is a view similar to FIG. 37 illustrating a fourth bend to construct the present invention.

As best seen in FIG. 37, the arm plate 246 is next bent ninety degrees (90°) upon an arm coupling line 268 for defining the ninety degree bend 94. In FIG. 38, the coupling member plate 244 is then bent ninety degrees (90°) upon a coupling member line 264 for defining the ninety degree bend 66. Upon the bending of the coupling member line 246, the front coupling member plate 248 is positioned adjacent to the wall plate 242 and the rear coupling member plate 250 is positioned adjacent to the wall plate 242. Both the front coupling member plate 248 and the rear coupling member plate 250 may be welded to the wall plate 242.

Figure 39:
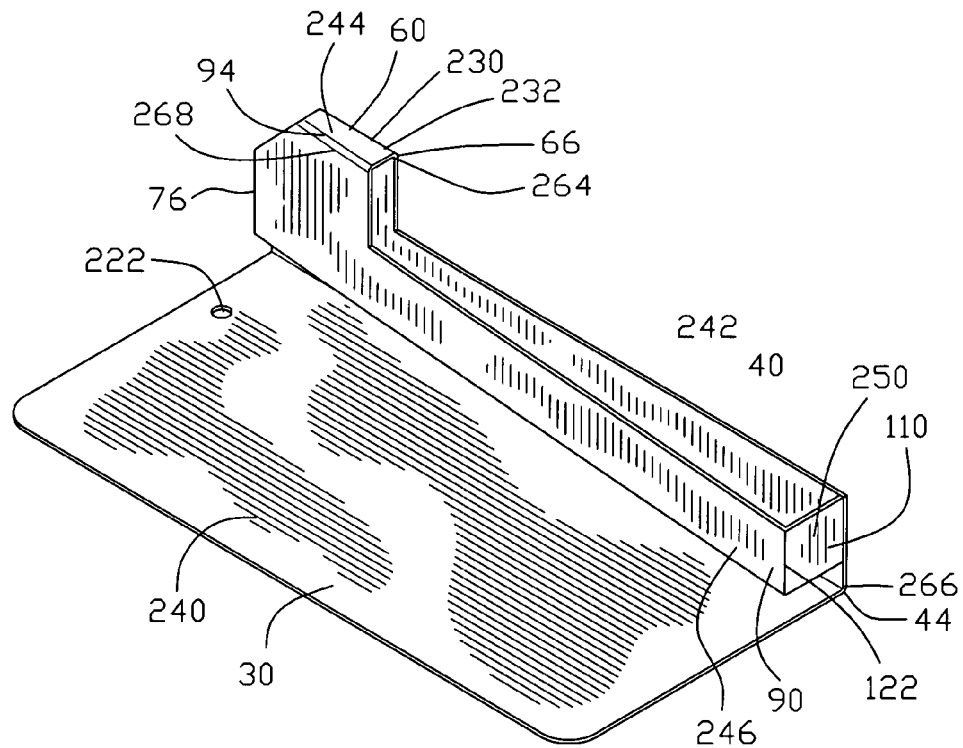
FIG. 39 is a view similar to FIG. 38 illustrating a fifth bend to construct the present invention.
Figure 40:
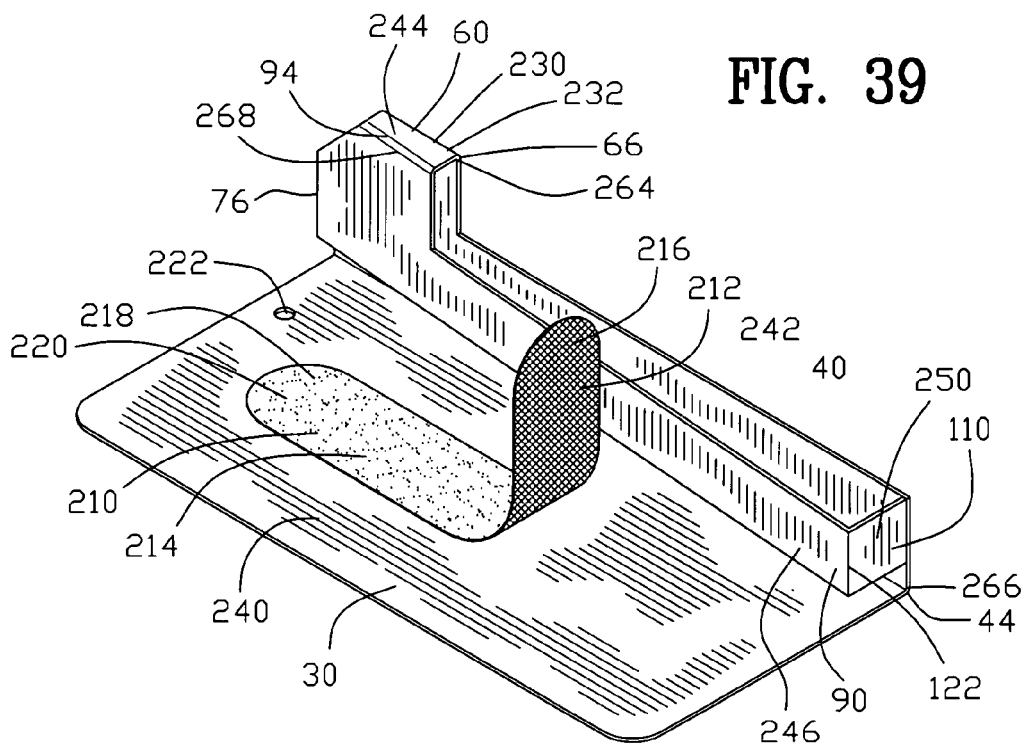
FIG. 40 is a view similar to FIG. 39 illustrating the installation of a non-skid layer.

In FIG. 39, the wall plate 242 is then bent ninety degrees (90°) upon a base coupling line 266 for defining the ninety degree bend 44. In FIG. 40, the non-skid pad 210 may be secured to the base engaging surface 34 by an adhesive layer 216. The non-skid pad 210 prevents the cutlery board 140 from displacement relative to the receptacle 10.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A receptacle for retaining a cutlery instrument, the cutlery instrument having a blade and a handle, comprising:
    a base having a base support surface and a base engaging surface;
    a wall member secured to said base engaging surface extending substantially perpendicular from said base;
    a coupling member secured to said wall member extending substantially parallel to and above said base;
    an arm member secured to said coupling member extending substantially parallel to said wall member and above said base;
    a slit defined between said wall member and said arm member for receiving and maintaining the blade of the cutlery instrument in a static position; and
    a slot defined between said arm member and said base engaging surface for exposing said wall member.

2. A receptacle for retaining a cutlery instrument as set forth in claim 1, wherein said coupling member includes a top coupling member for preventing vertical displacement of the blade.

3. A receptacle for retaining a cutlery instrument as set forth in claim 1, wherein said coupling member includes a top coupling member for preventing vertical displacement of the blade; and
    a cavity defined between said top coupling member and said base engaging surface for exposing said wall member.

4. A receptacle for retaining a cutlery instrument as set forth in claim 1, wherein said coupling member further includes a front coupling member for preventing horizontal displacement of the blade.

5. A receptacle for retaining a cutlery instrument as set forth in claim 1, wherein said coupling member further includes a front coupling member for preventing horizontal displacement of the blade; and
    an opening defined between said front coupling member and said base engaging surface for exposing said wall member.

6. A receptacle for retaining a cutlery instrument as set forth in claim 1, wherein a rear coupling member is secured between said wall member and said arm member for preventing horizontal displacement of the blade.

7. A receptacle for retaining a cutlery instrument as set forth in claim 1, wherein a rear coupling member secured between said wall member and said arm member for preventing horizontal displacement of the blade; and
    an orifice defined between said rear coupling member and said base engaging surface for exposing said wall member.

8. A receptacle for retaining a cutlery instrument as set forth in claim 1, wherein said base and said wall member are an integral one piece unit; and
    a ninety degree bend positioned between said base and said wall member for maintaining said wall member substantially perpendicular to said base.

9. A receptacle for retaining a cutlery instrument as set forth in claim 1, wherein said wall member and said coupling member are an integral one piece unit; and
    a ninety degree bend positioned between said wall member and said coupling member for maintaining said coupling member substantially perpendicular to said wall member.

10. A receptacle for retaining a cutlery instrument as set forth in claim 1, wherein said coupling member and said arm member are an integral one piece unit; and
    a ninety degree bend positioned between said coupling member and said arm member for maintaining said arm member substantially perpendicular to said coupling member.

11. A receptacle for retaining a cutlery instrument and engaging a cutlery board, the cutlery instrument having a blade and a handle and the cutlery board having a board support surface and a board engaging surface, comprising:
    a base having a base support surface and a base engaging surface;
    a wall member secured to said base engaging surface extending substantially perpendicular from said base;
    a coupling member secured to said wall member extending substantially perpendicular and above said base;
    an arm member secured to said coupling member extending substantially perpendicular to said wall member and above said base;
    a slit defined between said wall member and said arm member for receiving and maintaining the blade of the cutlery instrument in a static position;

a slot defined between said arm member and said base engaging surface for exposing said wall and permitting the cutlery board to traverse below said arm member, and a board support surface of a cutlery board positioned adjacent to said base engaging surface and within said slot for permitting the blade of the cutlery instrument to rest upon a board engaging surface of the cutlery board.

12. A receptacle for retaining a cutlery instrument as set forth in claim 11, wherein said coupling member includes a top coupling member for preventing vertical displacement of the blade; and a cavity defined between said top coupling member and said base engaging surface for exposing said wall member and permitting the cutlery board to traverse below said arm member.

13. A receptacle for retaining a cutlery instrument as set forth in claim 11, wherein said coupling member includes a front coupling member for preventing horizontal displacement of the blade; and an opening defined between said front coupling member and said base engaging surface for exposing said wall member and permitting the cutlery board to traverse below said arm member.

14. A receptacle for retaining a cutlery instrument as set forth in claim 11, wherein a rear coupling member is secured between said wall member and said arm member for preventing horizontal displacement of the blade; and an orifice defined between said rear coupling member and said base engaging surface for exposing said wall member and permitting the cutlery board to traverse below said arm member.

15. A receptacle for retaining a cutlery instrument as set forth in claim 11, wherein said base and said wall member are an integral one piece unit; and a ninety degree bend positioned between said base and said wall member for maintaining said wall member substantially perpendicular to said base.

16. A receptacle for retaining a cutlery instrument as set forth in claim 11, wherein said wall member and said coupling member are an integral one piece unit; and a ninety degree bend positioned between said wall member and said coupling member for maintaining said coupling member substantially perpendicular to said wall member.

17. A receptacle for retaining a cutlery instrument as set forth in claim 11, wherein said coupling member and said arm member are an integral one piece unit; and a ninety degree bend positioned between said coupling member and said arm member for maintaining said arm member substantially perpendicular to said coupling member.

18. A receptacle for retaining a cutlery instrument and engaging a cutlery board surface, the cutlery instrument having a blade and a handle, the blade having a blade edge, a blade spine, a blade tip and a blade heel, the cutlery board having a board support surface and a board engaging surface, comprising:

a base having a base support surface and a base engaging surface;

a wall member secured to said base engaging surface extending substantially perpendicular from said base;

a top coupling member secured to said wall member extending substantially parallel to and above said base for contacting the blade spine to prevent vertical displacement of the blade;

a front coupling member secured to said wall member extending substantially perpendicular to and above said base for contacting the blade tip to prevent horizontal displacement of the blade;

an arm member secured to said coupling member extending substantially parallel to said wall member and above said base;

a slit defined between said wall member and said arm member for receiving and maintaining the blade of the cutlery instrument in a static position;

a slot defined between said arm member and said base engaging surface for exposing said wall member and permitting the cutlery board to traverse below said arm member;

an rear coupling member secured between said wall member and said arm member for contacting the blade heel to prevent horizontal displacement of the blade; and a board support surface of a cutlery board positioned adjacent to said base engaging surface and within said slot for permitting the blade of the cutlery instrument to rest upon a board engaging surface of the cutlery board.

19. A receptacle for retaining a cutlery instrument as set forth in claim 18, wherein said base, said wall, said top coupling member, said front coupling member, said arm member and said rear coupling member are an integral one piece unit.

20. A receptacle for retaining a cutlery instrument as set forth in claim 18, wherein an opening defined between said front coupling member and said base engaging surface for exposing said wall member and permitting the cutlery board to traverse below said arm member; and an orifice defined between said rear coupling member said base engaging surface for exposing said wall member and permitting the cutlery board to traverse below said arm member.

\* \* \* \* \*